United States Patent
Rosen et al.

(10) Patent No.: US 7,307,990 B2
(45) Date of Patent: *Dec. 11, 2007

(54) SHARED COMMUNICATIONS NETWORK EMPLOYING VIRTUAL-PRIVATE-NETWORK IDENTIFIERS

(75) Inventors: Eric C. Rosen, Arlington, MA (US); Yakov Rekhter, New Rochelle, NY (US)

(73) Assignee: Cisco Technology, Inc., San Jose, CA (US)

( * ) Notice: Subject to any disclaimer, the term of this patent is extended or adjusted under 35 U.S.C. 154(b) by 1141 days.

This patent is subject to a terminal disclaimer.

(21) Appl. No.: 10/246,936

(22) Filed: Sep. 19, 2002

(65) Prior Publication Data

US 2003/0016672 A1    Jan. 23, 2003

Related U.S. Application Data

(63) Continuation of application No. 09/232,947, filed on Jan. 19, 1999, now Pat. No. 6,463,061.

(51) Int. Cl.
H04L 12/28 (2006.01)
H04L 12/56 (2006.01)

(52) U.S. Cl. ..................... 370/392; 370/401
(58) Field of Classification Search ............. None
See application file for complete search history.

(56) References Cited

U.S. PATENT DOCUMENTS 5,243,342 A    9/1993    Kattemalalavadi et al.

(Continued)

OTHER PUBLICATIONS

P. Newman et al., "Ipsilon Flow Management Protocol Specification for Ipv4 Version 1.0," Internet Community's Request for Comments No. 1953, (May 1996).

(Continued)

*Primary Examiner*—Chi Pham
*Assistant Examiner*—Soon D. Hyun
(74) *Attorney, Agent, or Firm*—Cesari and McKenna, LLP

(57) ABSTRACT

A service provider's routers (PE1, P1, P2, PE2) provide connections between and share routing information with routers (CE1, CE2) of a customer virtual private network (VPN) as well as routers of other customers' VPNs, which may have overlapping address spaces. A service provider's edge router (PE1) informed by the customer's router (CE1) that it will forward packets to a given prefix notifies the other edge router (PE2) that PE1 can forward packets to that address prefix if the destination is in the VPN to which CE1 belongs. PE1 also tells PE2 to tag any thus-destined packets with a particular tag T3. PE2 stores this information in a forwarding information base that it separately keeps for that VPN so that when PE2 receives from a router CE2 in the same VPN a packet whose destination address has that prefix, it tags the packet as requested. But PE2 also tags it with a tag T2 that the router P2 to which PE2 first sends it has asked PE2 to apply to packets to be sent to PE1. P2 routes the packet in accordance with T2, sending it to P1 after replacing T2 with a tag T1 that P1 has similarly asked P2 to use. P1 removes T1 from the packet and forwards it in accordance with T1 to PE1, which in turn removes T3 from the packet and forwards it in accordance with T3 to CE1. In this manner, only the edge routers need to maintain separate routing information for separate VPNs.

24 Claims, 8 Drawing Sheets

U.S. PATENT DOCUMENTS

| | | | |
|---|---|---|---|
| 5,309,430 A | 5/1994 | Verhille et al. | |
| 5,353,283 A | 10/1994 | Tsuchiya | |
| 5,394,402 A | 2/1995 | Ross | |
| 5,426,637 A | 6/1995 | Derby et al. | |
| 5,452,294 A | 9/1995 | Natarajan | |
| 5,491,692 A | 2/1996 | Gunner et al. | |
| 5,500,860 A | 3/1996 | Perlman et al. | |
| 5,519,704 A | 5/1996 | Farinacci et al. | |
| 5,555,256 A | 9/1996 | Calamvokis | |
| 5,561,669 A | 10/1996 | Lenney et al. | |
| 5,623,492 A | 4/1997 | Teraslinna | |
| 5,650,993 A | 7/1997 | Lakshman et al. | |
| 5,651,002 A | 7/1997 | Van Seters et al. | |
| 5,845,087 A * | 12/1998 | Trehus | 709/242 |
| 5,917,820 A | 6/1999 | Rekhter | |
| 5,949,786 A | 9/1999 | Bellenger | |
| 5,996,021 A | 11/1999 | Civanlar et al. | |
| 6,038,322 A | 3/2000 | Harkins | |
| 6,055,575 A | 4/2000 | Paulsen et al. | |
| 6,081,524 A | 6/2000 | Chase et al. | |
| 6,188,671 B1 | 2/2001 | Chase et al. | |
| 6,215,878 B1 | 4/2001 | Harkins | |
| 6,226,748 B1 * | 5/2001 | Bots et al. | 726/15 |
| 6,337,861 B1 | 1/2002 | Rosen | |
| 6,442,169 B1 | 8/2002 | Lewis | |
| 6,490,290 B1 | 12/2002 | Zhang et al. | |

OTHER PUBLICATIONS

M. Perez et al., "ATM Signaling Support for IP over ATM," Internet Community's Request for Comments No. 1755, (Feb. 1995).

J. Heinanen, "Multiprotocol Encapsulation over ATM Adaptation Layer 5," Internet Community's Request for Comments No. 1483, (Jul. 1993).

M. Laubach, "IP over ATM Working Group's Recommendations for the ATM Forum's Multiprotocol BOF Version 1," Internet Community's Request for Comments No. 1754, (Jan. 1995).

M. Laubach, "Classical IP and ARP over ATM," Internet Community's Request for Comments No. 1577, (Jan. 1994).

Martin de Prycker, Asynchronous Transfer Mode Solution for Broadband ISDN, Prentice Hall, 1995, pp. 5-11, 87-90.

D. Ginsberg, ATM Solutions for Enterprise Internetworking, Addison-Wesley Longman 1996, pp. xv-xiv, 36-41, 72-76.

R. Ullmann, "Rap: Internet Route Access Protocol," Internet Community's Request for Comments No. 1476, (Jun. 1993).

M. McGovern, et al., "CATNIP: Common Architecture For The Internet," Internet Community's Request for Comments No. 1707, (Oct. 1994).

S. Deering, et al., "Internet Protocol, Version 6," Internet Community's Request for Comments No. 1883, (Dec. 1995).

Information Technology—Telecommunications And Information Exchange Between Systems—Protocol For Exchange Of Inter-Domain Routeing Information Among Intermediate Systems To Support Forwarding of ISO 8473 PDU's, International Standard ISO/IEC, Oct. 1, 1994.

Amendment 1, International Standard ISO/IEC, (Oct. 1, 1995).

K. Nagami et al., "Toshiba's Flow Attribute Notification Protocol (FANP) Specification," Internet Community's Request for Comments No. 2129, (Apr. 1997).

Y. Katsube et al., "Toshiba's Router Architecture Extensions for ATM: Overview," Internet Community's Request for Comments No. 2098, (Feb. 1997).

A. Viswanathan et al., "ARIS: Aggregate Route-Bases IP Switching," Internet Draft (Mar. 1997).

P. Newman et al., "Ipsilon's General Switch Management Protocol Specification Version 1.1," Internet Community's Request for Comments No. 1987, (Aug. 1996).

N. Feldman, "ARIS Specification," Internet Draft (Mar. 1997).

"ISDN Data Link Layer Specification for Frame Mode Bearer Services," CCITT Recommendation Q.922, International Telecommunication Union, Geneva, 1992.

"Digital Subscriber Signaling. System No. 1 (DSS 1) —Signalling Specification for Frame Mode Basic Call Control," ITU-T Recommendation Q.933, International Telecommunication Union, Geneva, 1994.

G. P. Chandranmenon and G. Varghese, "Trading Packet Headers for Packet Processing," Proc., 1995.

Callon et al., "A Framework for Multiprotocol Label Switching," IETF Network Working Group Internet Draft draft-ietf-mpls-framework-02.txt, Nov. 21, 1997.

Rosen et al., "A proposed Architecture for MPLS," IETF Network Working Group Internet Draft draft-ietf-mpls-arch-00.txt, Aug. 1997.

Woundy et al., "ARIS: Aggregate Route-Based IP Switching,", Internet Draft draft-woundy-aris-ipswitching-00.txt, Nov. 1996.

Kalyaranaman et al., "Performance and Buffering Requirements of Internet Protocol over ATM ABR and UBR Services," IEEE Communications Magazine, vol. 36, No. 6, Jun. 1998.

* cited by examiner

SHARED COMMUNICATIONS NETWORK EMPLOYING VIRTUAL-PRIVATE-NETWORK IDENTIFIERS

CROSS-REFERENCE TO RELATED APPLICATIONS

The present application is a continuation of commonly assigned U.S. application Ser. No. 09/232,947, filed Jan. 19, 1999, now U.S. Pat. No. 6,463,061, issued on Oct. 8, 2002, which was filed on Jan. 19, 1999, by Yakov Rekhter and Eric C. Rosen for a Shared Communications Network Employing Virtual-Private-Network Identifiers and is hereby incorporated by reference.

BACKGROUND OF THE INVENTION

The present invention is directed to communications networking. It is directed particularly to providing routing for private wide-area networks.

1. Private Wide-Area Networks

An enterprise that has many sites can build a private wide-area network by placing routers at each site and using leased lines to interconnect them. A router that has a wide-area connection to another router may be called a "backbone router." The "backbone network" is the set of backbone routers and their interconnections.

If every backbone router is connected to every other backbone router, the backbone network is said to be "fully meshed." In a fully meshed backbone network, data that travel from one site to another go through the backbone router at an origin site ("ingress router"), travel over the leased line to the backbone router at the target site ("egress router"), and then enter the target site. More commonly, though, the backbone network is not fully meshed; a router is connected to only a small number of others (three or four). In such a sparse topology, the ingress and egress routers may not be directly connected. In this case, data may have to pass through several additional, "transit" routers on the way from ingress to egress.

In a private network like this, the design and operation of the backbone network is the responsibility of the enterprise. A routing algorithm must run in the backbone routers, enabling them to tell each other the addresses of the destinations to which they can respectively afford access.

It is worth noting that a leased line is not actually a piece of wire going from one site to another. It is really a circuit through some circuit-switching network. But this is of no import to the enterprise network manager, to whom those circuits can be considered simple unstructured pipes. Conversely, although the telephone network itself requires considerable management, the telephone-network managers do not need to know anything about the enterprise backbone network; to them, the telephone network just provides point-to-point connections. They do not need to know what role these connections might be playing in an enterprise data network.

We may say that the enterprise network is "overlaid" on top of the telephone network. The enterprise network can be called the "higher layer" network, the telephone network the "lower layer" network. Both networks exist, but each is transparent to the other. The enterprise's backbone routers exchange routing information with each other, but the telephone switches do not store or process that routing information. That is, backbone routers are "routing peers" of each other, but they are not routing peers of the telephone switches. This way of building a higher-layer network on top of a lower-layer network is called the "overlay model."

2. Virtual Private Networks

Wide-area enterprise networks are now more likely to be built on top of frame-relay and ATM networks than on top of circuit-switched (telephone) networks. Whereas a telephone network really provides circuits between backbone routers, a frame-relay or ATM network provides "virtual circuits" between backbone routers. But this changes nothing as far as the enterprise's routing task is concerned; the overlay model still applies even though the lower-layer network is now a frame-relay or ATM network rather than a circuit-switched one, i.e., even though virtual rather than fixed circuits make the point-to-point connections between backbone routers. The two networks are still transparent to each other. The enterprise network manager still has a wide-area backbone to design and operate. However, because the circuits are "virtual," this is usually called a "virtual private network" (VPN) instead of a "private network."

Since the two networks are transparent to each other in the overlay model, that model is distinguished by the fact that the enterprise's backbone routers do not share with the (service provider's) frame-relay or ATM switches the routing information that they must share with each other. This causes inefficiency when the enterprise's backbone routers are not fully meshed. In such networks, some packets go from the ingress router through one or more transit routers before they reach the egress router. At each one of these "hops," the packet leaves the frame-relay or ATM network and then enters it again. This is sub-optimal—there is little value in having a packet go in and out of the frame-relay or ATM network multiple times.

This problem can be avoided by making the enterprise backbone fully meshed, but that causes problems of its own. The number of virtual circuits the enterprise has to pay the service provider for to make the network fully meshed grows as the square of the number of backbone routers. Apart from the cost, routing algorithms tend to scale poorly as the number of direct connections between routers grows. This causes additional problems.

The overlay model also tends to result in extra traffic when multicast is in use. It is usually impractical or undesirable for the "lower layer" network to do the necessary packet replication, so all packet replication must be done in the "higher layer" network, even if a number of replicated packets must then follow the same "lower layer" path up to a point.

3. The Peer Model

Since these considerations all impose upon the resources of an enterprise for which communications is not necessarily a core competence, a service provider ("SP") can afford its customers greater value if it absorbs the task of designing and operating the backbone. More specifically, the SP should so organize and operate the backbone that, from the point of view of a particular site administrator, every enterprise network address not located at a given site is reachable through the SP's backbone network. How the SP's backbone decides to route the traffic is the SP's concern, not that of the customer enterprise. So the customer enterprise does not really need to maintain a backbone router at each site; it just needs a router that attaches to one of the SP's backbone routers. As will become apparent, providing such an organization involves abandoning the overlay model for a different model. The new model will be called the "peer model" for reasons that will be set forth below.

Terminology:

C-network: the enterprise network, consisting of C-routers, which are maintained and operated by the enterprise.

P-network: the SP network, consisting of P-routers, which the SP maintains and operates.

CE-router: an "edge router" in the C-network, i.e., a C-router that attaches directly to a P-router and is a routing peer of the P-router.

PE-router: an "edge router" in the P-network, i.e., a P-router that attaches directly to a C-router and is a routing peer of the C-router.

If a P-router is not a PE-router, i.e., not an edge router, it is a transit router. The concept of edge and transit routers is relative to specific VPNs. If a given one of the SP's routers receives a given VPN's traffic from and forwards it to only others of the SP's routers, the given router is a transit router vis-à-vis the given VPN. Yet that same router may receive another VPN's traffic from and/or forward it to one of that other VPN's edge routers, in which case the given SP router is an edge router from the other VPN's point of view.

In the conventional peer model, where "virtual routers" (i.e., one instance of the routing algorithm per VPN) are used, all C-routers within the same VPN are routing peers of each other. But two C-routers will be routing adjacencies of each other only if they are at the same site. Each site has at least one CE router, each of which is directly attached to at least one PE router, which is its routing peer. Since CE routers do not exchange routing information with each other, there is no virtual backbone for the enterprise to manage, and there is never any need for data to travel through transit CE routers. Data go from the ingress CE router through a sequence of P-routers to the egress CE router. So the resultant routing is optimal. These clear customer benefits have led certain SPs to adopt the peer model.

The conventional peer-model approach also enables the SP to solve certain problems that arise from using a common backbone network for more than one client. One of these is address duplication. Although there is an international assigned-number authority from which unique addresses can be obtained, many enterprise networks simply assign their private-network addresses themselves. So their addresses are unique only within the particular enterprise: they may duplicate addresses that another customer enterprise uses. An SP trying to use, say, an Internet-Protocol ("IP") backbone as the backbone for different enterprise networks having overlapping address spaces needs to provide its P-routers with a way of identifying and selecting a route to the one of potentially many same-address destinations to which it should forward a packet.

So the SP makes use of a "virtual router." When a PE router receives a packet received from a CE router, the PE router "tags" the packet with an indication of the C-network where it originated. It then bases its determination of what router to forward the packet to not only on the packet's destination address but also on the identity of the originating C-network. At each subsequent hop, the router looks up the packet's destination address in the forwarding table specific to the C-network that the tag designates.

This also solves another multiple-customer problem, that of the access control. If an enterprise buys network-backbone service from an Internet SP, it wants some assurance that its network receives only packets that originated in its own network. It also wants to be sure that packets originating in its network do not leave the enterprise network by accident. Of course, two enterprises might want to be able to communicate directly, or to communicate over the Internet. But they want such communication to occur only through "firewalls." By using the virtual router, the SP solves this problem, too.

SUMMARY OF THE INVENTION

The above-identified parent patent application describes a way for an SP to provide its customers the peer model's advantages at costs considerably lower than those that the conventional virtual-router approach exacts. The present invention can be used to enable such systems to help support the customer network's security measures. A provider network employing this technique associates internal and external identifiers, which we call "VPN IDs," with a customer network and employs these selectively in forwarding reachability messages relating to customer nodes.

Specifically, a provider edge router linked to a given customer's edge router in a system that employs the present invention's teachings will ordinarily relay reachability information concerning customer sites from that router only to provider edge routers similarly linked to other edge routers of the same customer, to which they will in turn forward the reachability information. In doing so, it will include the customer's internal VPN ID in the message so that the receiving provider router can disambiguate the possibly non-unique IP address that the reachability message specifies. Those other provider edge routers will not forward the information to other outside routers that are not part of the network of the customer involved. But there is at least one of the same customer's edge routers from which a reachability message will cause the provider edge router linked to it to relay the reachability information to other provider edge routers and include the customer network's external VPN ID in doing so. This will typically be a router through which packets entering the customer's network must pass through a firewall, so it is the one to which traffic from outside that network should be sent.

When a provider edge router then receives from outside that customer network a packet directed to the address whose reachability was advertised with the customer's external VPN ID, it forwards the toward the provider edge router that attached the external VPN ID to the reachability message that advertised the destination, and that router can send it to the firewall site. In contrast, packets from within the customer network can be sent to through provider edge routers that used the internal VPN ID for reporting the destination's visibility.

BRIEF DESCRIPTION OF THE DRAWINGS

The invention description below refers to the accompanying drawings, of which.

DETAILED DESCRIPTION OF AN ILLUSTRATIVE EMBODIMENT

Overview

Figure 1:
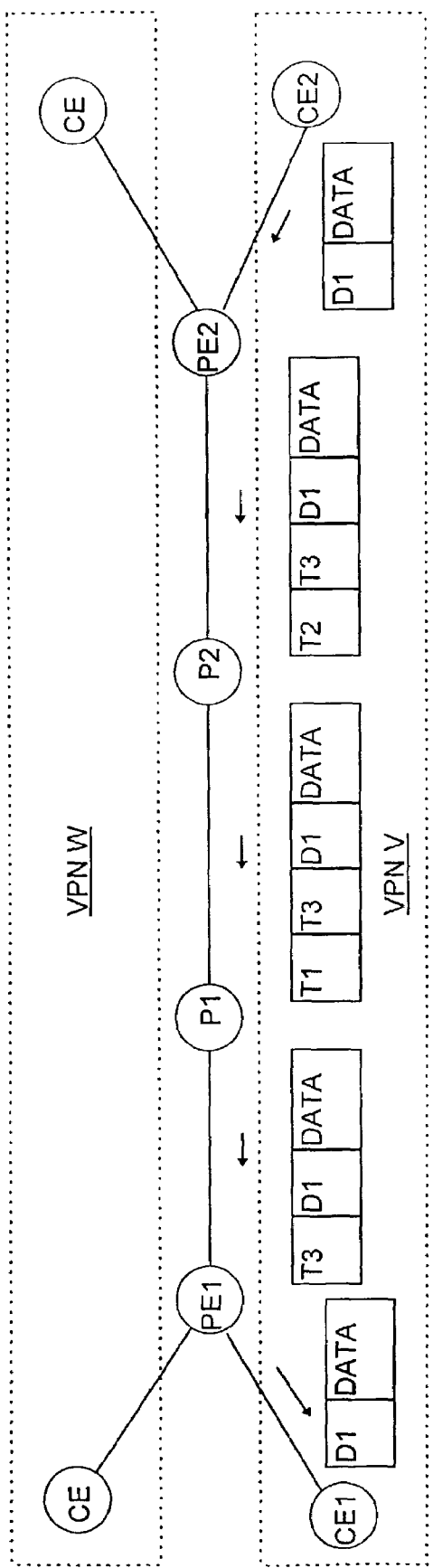
FIG. 1 is a topological diagram of a VPN and a tagging sequence that its routers employ.

Before we describe an embodiment of the invention in detail, we will employ FIG. 1 to present a brief overview of its operation.

FIG. 1 depicts a very simplified topology for illustrating an SP's connections between two parts of a customer enterprise C's VPN. Two of the enterprise's edge routers CE1 and CE2 are located remotely from each other, and the customer enterprise has contracted with the SP to provide connections between the customer's routers such as CE1 and CE2 to form a VPN V. Among the SP's resources are edge routers PE1 and PE2 and further, transit routers P1 and P2 that together form a path between CE1 and CE2.

Consider a packet that a router CE2 receives from a location (not shown) in VPN V, and suppose that the contents D1 of the packet's destination-address field is the address of a system in VPN V at CE1's location. We assume that CE2 has interfaces over which it could potentially have forwarded the packet to routers, not shown in the drawing, to which it is directly linked but that it concludes by consulting stored routing information that it should forward the packet over its interface to edge router PE2 in the SP.

We also assume that the SP network has another customer for which it uses those same resources to implement a different VPN, W, that also includes a (differently located) host having the same address D1. From the fact that PE2 has received the packet over its link with CE2, which is part of V rather than W, PE2 can tell which D1-addressed system should receive the packet. The VPNs that the SP cooperates with its customers to implement follow the peer model, so PE2 contains customer-network topological information that the customers have "leaked" to it. It stores this information in a separate routing table for each customer VPN to which PE2 is directly connected, so it can disambiguate the otherwise ambiguous address D1. From this information, PE2 knows that PE1 is the SP edge router to which it should direct the packet in order to reach the D1-addressed system in VPN V.

Now, the goal is to have that other edge router, PE1, forward the packet to CE1 so that the packet will reach the D1-addressed location in VPN V rather that the one in VPN W, to which PE1 may also be able to forward packets. Therefore, PE2 needs to include in the forwarded packet some indication that the intended D1-addressed host is the one in VPN V. But this should be done without requiring that transit routers P1 and P2 also maintain the VPN-specific information that the edge routers store.

PE2 achieves this by adding to the packet an internal-routing field that in the illustrated embodiment includes two constituent fields, namely, an egress-router field and an egress-channel field. The egress-router field takes the form of a tag that P2 can map to the next hop in the route to the egress edge router PE1, upon which the transit routers can base their routing decisions without requiring knowledge of the VPN involved. The egress-channel field takes the form of a tag that PE1 can interpret as specifying its interface with CE1 or as otherwise representing the channel that links it to VPN V.

Note that the goal of avoiding VPN-specific forwarding information could be achieved, though to a lesser degree, by having the internal-routing field include only an egress-channel field, not an egress-router field. The transit routers would then be basing their routing decisions on fields that in a sense do designate particular VPNs, but only because a given channel may lead only to nodes in a particular VPN. The transit routers still would not need to store information concerning locations in any of the customer sites.

But we prefer to use both an egress-router field and and egress-channel field. Specifically, PE2 "tags" the packet with two tags T2 and T3. As will be explained in detail below, P2 has arranged with its neighbors, including PE2, to tag with T2 any packets sent to P2 for forwarding along a route in which the SP edge router is PE1. T3 is a tag with which PE1 has arranged for the other edge routers to tag packets destined for certain VPN V locations if PE1 is the egress router.

Figure 2:
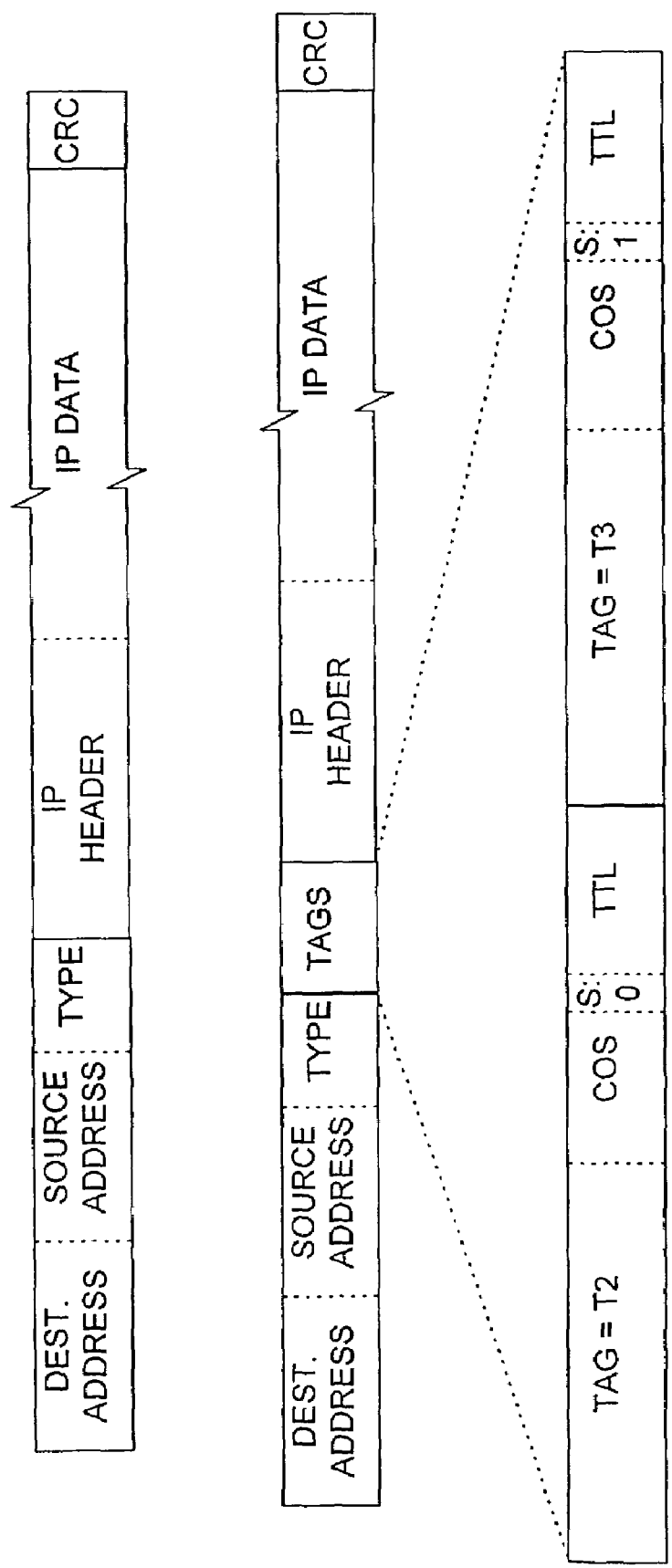
FIG. 2 is a diagram that illustrates the format of a tagged packet.

To describe one way to tag a packet, we begin with FIG. 2's first row, which illustrates an exemplary link-level-protocol format. Different link-level protocols may be employed on different links. Examples of such protocols are the IEEE 802 protocol family and the point-to-point protocol (PPP) specified in the Internet community's Requests for Comments ("RFCs") 1331 and 1332. Similar to the former is the Ethernet protocol. If the links connecting CE2 to PE2 and PE2 to P2 are Ethernet links, the link-layer frame that CE2 sends to PE2 takes the form that FIG. 2's top row depicts. Specifically, it consists of a link-level payload encapsulated by an Ethernet header and trailer. The Ethernet trailer consists of a cyclic-redundancy-code (CRC) field used for error detection. The Ethernet header includes destination-address and source-address fields, which respectively contain the link-level ("hardware") addresses of PE2's and CE2's interfaces to that link, and it also includes a type field used for demultiplexing the link packet's contents. In this case, the code represents the Internet Protocol (IP): the receiving router should interpret the contents as an LP "datagram" (as the IP protocol data unit is called), consisting of the IP header and IP data. (Of course, the payload could be a protocol data unit of some other network-level protocol, such as IPX or Appletalk.) Routers generally use network-protocol information to forward packets from one link to another along an internetwork path from the source interface to the ultimate destination interface.

FIG. 2's second row depicts the corresponding link-layer frame after PE2 has added T2 and T3. The Ethernet header and trailer take the same form as before. (For the sake of discussion, we assume that the link-level protocol is the same on the new link, although most embodiments will not exhibit such protocol uniformity.) Since the link-level source and destination are different, of course, the corresponding header fields' contents differ from those in the CE2-to-PE2 frame, and the CRC field contents, having been calculated from different frame contents, are different, too. But the difference most relevant to the present discussion is the type-field difference. Even though the frame does include an IP datagram, the type field does not contain the IP-indicating code. Instead, the code that it contains tells P2's interface that the frame's contents should be interpreted as a tagged packet.

This means that the four bytes immediately following the link-level header should be interpreted as an entry in a "tag stack," whose format FIG. 2's third row illustrates. Specifically, the first twenty bits should be interpreted as the tag, and the twenty-fourth, bottom-of-stack-indicator bit S tells whether the packet contains any more tag-stack entries. (Appendix A contains a thorough description of the manner in which a tag-switching router can use the various fields, so we will not discuss the other, COS and TTL fields here.) In the example the tag field contains the "top" tag value T2, while the S bit is zero, indicating that this is not the bottom tag-stack entry. Therefore, P2 should interpret the next four bytes as a tag-stack entry, too. In the example, that entry contains a tag value of T3 and an indication that it is the bottom stack entry.

We now return to FIG. 1 and assume that PE2 has just sent P2 a packet thus tagged. Since T2 is a tag that P2 has arranged to have PE2 attach to packets that should follow routes in which PE1 is the egress router, P2 knows to forward that packet to the neighbor, P1, to which it sends PE1-directed traffic. (Again, P2 must make a routing decision because we assume that it additionally has direct links to other routers.) Note that P2 is able to make this decision without having had to maintain separate routing information for the VPN to which the packet is ultimately destined.

When P2 forwards the packet to P1, it replaces tag T2 with a new tag, T1, which P1 has asked its neighbors to attach to any packets that should be sent though PE1-egress routes, and P1 similarly makes its routing decision without having had to maintain separate routing information for the destination VPN. P1's stored routing information tells it to remove a tag rather than replace it, so it does so before forwarding the packet to PE1.

From tag T3, PE1 knows that it should forward the packet to the edge router CE1 that affords access to the D1-addressed location in VPN V. So PE1 forwards the packet is to CE1 after removing tag T3. Since CE1 is concerned only with destination addresses in its own VPN, it is able to base its routing decision on D1 alone.

General Routing Features

Having now considered the illustrated embodiment's overall operation, we turn to a review of certain network-operation concepts that will provide a foundation for a more detailed discussion of the operation described in the above overview. In a typical implementation, router circuitry for performing functions described below will be provided as communications hardware operated by one or more processors software-configured to perform the described operations. Those skilled in the art will recognize that such an approach is usually the most practical, because software configuration of a general-purpose processor enables a relatively small amount of hardware to serve as circuitry for performing many different functions concurrently. But the present invention can instead be implemented in any circuitry that performs the functions described.

1. The FIB

In conventional IP forwarding, each router maintains a table, sometimes called the "Forwarding Information Base" (FIB), that it uses to map from "address prefixes" to "next hops." A router that receives a packet whose destination address begins with a given address prefix employs the next-hop entry as described below to determine the direction in which to forward the packet.

The manner in which the FIB is constructed is not critical to the present invention. In principle, a system administrator can provide it manually. More typically, routers build such tables automatically by employing routing algorithms to share topological information. But regardless of how the FIB is constructed, a conventional router R executes the following procedure (in principle) to find the next hop for a particular packet:

It searches the FIB for longest address prefix that matches the IP (or other network-level) address in the packet's network-level destination-address field.

It fetches the next-hop IP address, N, that corresponds to that address prefix.

If N is the address of a router to which R is directly connected (i.e., if there are no routers between R and the next hop), then the procedure ends, and R forwards the packet over its link to the router whose address is N.

If N is not the address of a router to which R is directly connected, then R performs a recursive lookup. That is, it searches the FIB for the longest address prefix that matches N, fetches the corresponding next-hop IP address N2, determines whether N2 is directly connected, etc. The recursion ends when R finds a next hop directly connected to it, and it R forwards the packet over its link to the router whose interface has that address.

In practice, as those skilled in the art will recognize, the FIB will have been preprocessed to eliminate the need to perform the recursion during actual packet processing. To avoid complicating the discussion unnecessarily, though, we omit a description of such conventional preprocessing.

A normal Internet router maintains only one FIB table. But routers in a provider of connections for many enterprises' peer-model VPNs need different tables for different VPNs, because a router may need to distinguish between potentially identical prefixes in different VPNs. (Each SP router also needs to maintain a general, i.e., non-VPN-specific, FIB. Unless explicitly stated otherwise, references below to the FIB mean the general FIB.) But transit routers, i.e., routers that are not directly attached to customer's VPN, do not need to maintain VPN-specific FIBs. (We consider a PE router to be "directly attached" to a particular VPN if it is directly attached to a CE router in that VPN.) And an edge router such as PE1 or PE2 needs to maintain, in addition to a general FIB, a separate FIB only for each VPN to which it is connected directly. The reason why this is so will become apparent as the description proceeds.

In the illustrated embodiment, each FIB entry actually differs somewhat from that described above, because the illustrated embodiment uses "tag switching." When data-transmission speeds become high and network sizes become large, searching for longest matches to the packet's ultimate-destination address becomes onerous. So proposals have been made to reduce this burden by "tagging" the packets.

A tag is a field that routers use to make routing decisions. Unlike a network-level address, though, a tag is a true (unique) index to a given router's routing table, whereas the network (e.g., IP) address in the destination field of a packet's header is merely an invitation to a router to find the address prefix that constitutes the best match. By reducing the need for best-match searches, conventional tagging reduces a router's processing burden. And we use tagging in such a way as additionally to reduce routers' storage burdens, as will become apparent after a discussion of further tag-switching and other features.

One way to implement tag switching is to have routers tell their neighbors the tags they want to see in the packets that they receive. Specifically, a given router may decide to associate a particular tag with ("bind a particular tag to") a particular address prefix. If so, it tells its neighbor routers that, when they forward it a packet destined for an address having that prefix, they should attach the specified tag so that the given router can go straight to the right table entry without having to do a best-match search. (Although the illustrated embodiment bases tagging on address prefixes, other embodiments may base it on some other packet attribute that is relevant to routing.)

When tag switching is used, the forwarding table does not merely map an address prefix to a next-hop IP address; it maps the address prefix to an ordered pair whose first element is a next-hop IP address and whose second element is a tag-stack operation. That is, an FIB next-hop entry contains both a next-hop IP address and a tag-stack operation.

Initially, we need to consider only two tag-stack operations:

No op.

Push a specified tag value onto the stack.

The "no op" value is the default tag-stack-operation entry. As will be explained below, neighbors' requests may result in that entry's being modified to contain a push operation.

When router R receives an untagged packet, it finds the longest address-prefix match to R's destination IP address, and it fetches the corresponding next-hop entry. If that next-hop entry's tag operation is "push a specified tag value onto the stack," it pushes the specified tag value onto the tag stack that the packet includes. If it is necessary for R to perform a recursive lookup, it searches for another next-hop entry. If that next-hop entry also has a "push a specified tag value onto the stack" operation in it, that specified value is also pushed. If the recursion ends as a result of the second lookup, then two tag values may have been pushed onto the tag stack.

When the recursion ends (or if there is no recursion), R knows which of its directly connected neighbors is the next hop for the packet. It then transmits the packet to that next hop, using whatever data-link protocol is necessary in order to reach that next hop.

2. The TIB

When a router R uses tag switching, it fetches next-hop information in response to a tag, so it uses a routing table separate from the FIB, from which it fetches next-hop information in response to a destination address. This separate table is sometimes called the Tag Information Base (TIB). The TIB next-hop entries contain a next-hop IP address and a tag-stack operation. For our purposes, we need consider only three tag-stack operations:

remove the tag stack's last-added ("top") value ("pop the stack");

replace the top tag-stack value with a specified value; and discard the packet.

When router R receives a tagged packet, it uses the packet's top tag as an index into the TIB and fetches the indicated entry. (Those skilled in the art will recognize that security requirements, local-link constraints, or other considerations may in some cases necessitate that the index into the TIB actually consist of both the incoming packet's tag and the interface on which it arrived, but the principle is best explained without complicating the discussion with those details.) In accordance with the fetched TIB entry, it either replaces the tag with a different value or pops the tag stack.

If the TIB entry's next-hop field is the address of one of R's directly connected neighbors, R uses the appropriate data-link protocol to send the tagged packet to that neighbor. If the next hop specified in the TIB entry is not a directly connected neighbor, on the other hand, then R (again, in principle) performs a recursive lookup by finding the FIB entry that corresponds to that address. (The FIB is used since this part of the search is based on an address, not a tag.) Then processing proceeds as described in "The FIB" above.

3. How Interior Routing Algorithms Modify the FIB and the TIB

As was stated above, the present invention does not require any particular mechanism for providing the contents of the FIB and the TIB. But considering one such mechanism, namely, routing protocols, helps one appreciate those contents' purpose. The types of protocols that it uses can be divided into interior gateway protocols (IGPs), exterior gateway protocols (EGPs), and tag-distribution protocols (TDPs). Routers in an inter-networking domain under single administration use IGPs to share topological information about that domain. Routers use EGPs to share extra-domain topological information. They use TDPs to distribute tags.

Typically, every router runs an IGP. Examples of such protocols are OSPF, EIGRP, and IS-IS. From time to time, a router sends to its same-domain neighbor routers IGP messages that "advertise" destinations to which it accords direct access. The neighbors in turn forward the messages to their neighbors. In some protocols the forwarding routers modify the messages in such a way that a message tells what route it took to reach the recipient, or at least how long the route was. In any case, the recipient thereby amasses topological information and decides on the basis of that information whether to enter into its FIB as the next hop to the advertised destinations the address of the router that forwarded it the message. So FIB entries that an IGP creates are always non-recursive: the next hop is always a directly connected neighbor.

The customer-enterprise routers may also use an IGP. Although the drawing does not show them, the customer enterprise would typically also have further routers at the same sites as CE1 and CE2, and those routers may use an IGP. But the customer enterprise's nodes that have access to each other only through the provider network do not use an IGP to exchange routing information with each other, so the routers at, for instance, CE1's site use an IGP only for routing-information exchange with other routers at the same site (or other sites to which there is customer-managed access), not for such exchange with routers at CE2's site.

When IGP maps address prefix X to next hop N, it may modify both the FIB and the TIB. The FIB modifications are as follows:

If the FIB already contains an entry that maps X to a next hop, and the next hop is N, then no change is made.

If the FIB does not already contain an entry that maps X to any next hop, or if the FIB already contains an entry that maps X to a next hop other than N, then IGP inserts an entry that maps X to N and removes any entry that maps X to a different router. In a tag-switching routine, the IGP process then determines whether N has sent R a message that binds X to some tag value T. If not, the FIB entry is inserted with the tag-stack operation "no op." Otherwise, the FIB entry is inserted with the tag-stack operation "push T onto the stack."

The TIB modifications are as follows:

If no FIB modification has been made, then no TIB modification is made, either.

If an FIB modification has been made, then R determines whether it has told any of its directly connected neighbors to tag X-destined packets with some tag value T.

If not, it makes no TIB modifications. Otherwise, it looks up the TIB entry that corresponds to T.

If there is no corresponding TIB entry, R inserts one for tag T having a next-hop entry of N. If there is a corresponding TIB entry, it replaces the next-hop entry with N.

R then determines whether N has asked it to tag X-destined tags with some tag value T2. If not, the tag-stack operation is "discard the packet." Otherwise:

If N's requested "tag" T2 for X-destined packets is a actually a distinguished tag value that means "pop the tag stack," then N has not really asked that R place a tag on such packets but instead has asked that it merely remove one already in the packet. So TIB entry's tag-stack operation is "pop the tag stack."

Otherwise, the TIB entry's tag-stack operation is "replace the packet's top tag-stack value with T2."

A distinguished value of "next hop" that may exist in both the FIB and the TIB is "me." This means that a packet has reached its final hop, and is delivered to local software rather than forwarded over a data link to a next hop.

4. Edge Routers and the IGP

Now, it was stated above that IGP speakers periodically advertise address ranges to which they afford direct access. If P1 is on a subnet in which all hosts' addresses start with 192.3.45, for instance, it will advertise this prefix, and every IGP speaker in the SP network will have an entry for that prefix in its FIB. Therefore, if PE1 has an interface on the same subnet, say with an address of 192.3.45.12, then those IGP speakers will be able to determine how to reach PE1. But it will become apparent as the description proceeds that, in order to assign certain tags, the illustrated embodiment requires each SP router additionally to have PE1's full address as a prefix in its FIB. And, in general, each SP router should have such a "host route" for every PE-router. (A host route is one whose prefix is the length of a complete IP address and thus corresponds to only one host.) So edge routers in the illustrated embodiment advertise not only the address ranges to which they have access but also their own complete addresses. (Actually, as will shortly be explained, the edge routers are also "BGP speakers," which would conventionally advertise their host routes in IGP anyway.)

5. How BGP Modifies the TIB and the FIB

It was mentioned above that IGPs are used for propagating routing information among routers connected by routes within a commonly administered domain. In such a domain, the assumption is that routers are generally to cooperate in routing any received packets and that they will accumulate routing information from all sources within that domain. But a domain administered by one entity may additionally be connected to domains administered by others. For such connections, a given domain may choose to be selective about what traffic it will forward and which of its resources it will make available for that purpose. Additionally, it typically is not practical to accumulate routing information from all routers in every other domain, even if the other domains were inclined to supply it, so inter-domain topology-information sharing calls for some selectivity.

This is not something to which IGPs are well suited. For communicating information of that type, therefore, routers involved in communication among such "autonomous systems," as they are called, use external routing protocols, such as External Gateway Protocol (EGP). For the sake of concreteness, we assume here that the external routing protocol used here is the one specified in RFC 1654 and referred to as the Border Gateway Protocol (BGP).

In BGP, the type of message used to advertise a route is called an "update" message. In a conventional, non-tag-switching BGP implementation, an update message contains an address prefix, a "BGP next hop," and an AS Path, which lists the autonomous systems traversed in reaching the advertised destinations. With tag switching, this is modified to add a tag to each address prefix.

When a router R receives a BGP update message for address prefix X from a BGP peer R2, R runs the BGP decision process. Policies that the BGP process implements may or may not result in R's installation of R2's route to X. But if they do, then:

If the FIB does not already contain an entry that maps X to a next hop, or if it contains an entry that maps X to a next hop other than the one specified in R2's BGP update message, then R adds an entry that maps X to the specified next hop, and it removes any previous entry for X. This next hop will not in general be a directly connected neighbor of R, so the FIB entry may be a recursive one. (In the cases in which we are interested, R2 will specify itself as the BGP next hop, in which case the FIB entry will map X to R2.) If R2's BGP Update message specified tag value T for address prefix X, then the tag-stack operation in the FIB entry is "push T onto the tag stack." Otherwise, the tag-stack operation is "no op."

If the FIB already contains an entry that maps X to a next hop, and the next hop is the same as the one specified in R2's BGP Update message, then the FIB entry's next-hop field is left unchanged. If R2's BGP Update message specified tag value T for address prefix X, then the FIB entry's tag-stack operation is changed (if necessary) to be "push T onto the tag stack." If R2's BGP Update message specifies no tag value for X, then the tag stack operation in the FIB entry is changed (if necessary) to "no op."

6. The Decision to Distribute a Tag Binding

The preceding discussion concerned what happens when a router has asked another router to associate a tag with a prefix. We now describe the circumstances under which a router makes such a request.

In most tag-switching proposals, a router is allowed to bind a tag to an address prefix if the router's FIB table includes an entry that corresponds to that address prefix. In the illustrated embodiment, if the FIB-entry "prefix" is the complete address ("host route") of a router in the SP's network, then binding a tag to that prefix is not only permitted but required.

If X is the (thirty-two-bit) address of the router R itself, then the tag value that R binds to X is the distinguished value that means "pop the tag stack."

When a tag T is bound to an address prefix X, and the FIB entry for X was inserted as a result of running the IGP, R will distribute the tag binding to its directly connected neighbors by using a tag-distribution protocol that will be described below.

When a tag T is bound to an address prefix X, and the FIB entry for X was inserted as a result of running BGP, R will use BGP to distribute the tag binding, in a manner that will be described below, to any BGP peer to which it distributes the route to X.

If router R binds to an address prefix X a tag T other than the distinguished value that means "pop the tag stack," then R also creates a T-indexed TIB entry in its own TIB table.

The TIB entry is created as follows.

Suppose that R is a PE router, and address prefix X is one for which the next hop is a directly attached CE router. (As will be explained below, the prefix value will have been enhanced to distinguish X in CE's VPN from X in others'.) Then the TIB entry will specify the CE router as the next hop, and its tag-stack-operation entry will be "pop the tag stack."

Suppose that the FIB entry corresponding to X specifies a next hop of N and a tag-stack operation of "push value T2 onto the stack." Then the TIB entry will give N as the next hop and "replace the value at the top of the stack with T" as the tag-stack operation.

Suppose that the FIB entry corresponding to X specifies a next hop of N and a tag-stack operation of "no op." Then the TIB entry will specify a next hop of N, and a tag-stack operation of "discard the packet."

Detailed Example

We now have enough background to describe in detail the way in which the illustrated embodiment performs the operations mentioned briefly in connection with FIG. 1. For this purpose, we return to FIG. 1.

All of FIG. 1's P routers (PE1, PE2, P1, and P2) participate in a common IGP. CE1 and CE2 do not participate in this IGP. CE1, PE1, CE2, and PE2 are BGP speakers. CE1 has an External BGP (EBGP) connection to PE1, PE1 has an Internal BGP (IBGP) connection to PE2, and PE2 has an External BGP connection to CE2. (As those skilled in the art are aware, the way in which a BGP speaker reacts to BGP messages originating in its own autonomous system differ from the way in which it responds to BGP messages that originate in a different autonomous system. The BGP session is commonly referred to as "internal" in the former case and "external" in the latter.)

1. FIB Entries that IGP Creates

Since PE1 is an edge router, it exports its own thirty-two-bit address into the P-network's IGP. As a result:

PE2 has an FIB entry that maps PE1 to a next-hop value of P2. Since P2 is directly connected to PE2, this entry is non-recursive.

P2 has an FIB entry that maps PE1 to a next-hop value of P1. Since P1 is directly connected to P2, this entry is non-recursive.

P1 has a FIB entry that maps PE1 to a next hop value of PE1. Since PE1 is directly connected to P1, this entry is non-recursive.

PE1 has a FIB entry that maps PE1 to a next hop value of "me."

2. TDP Messages; TIB Entries Created as a Result of TDP Processing

As was mentioned above, the illustrated embodiment requires that each of the SP's routers construct a TIB by assigning tags to all of the prefixes for which its FIB has entries and that it ask its neighbors to use those tags in forwarding data packets to it. A mechanism that they can use to make those requests is a tag-distribution protocol (TDP). Appendix B describes that protocol in detail. Here we only digress briefly to mention certain salient features.

Figure 3:
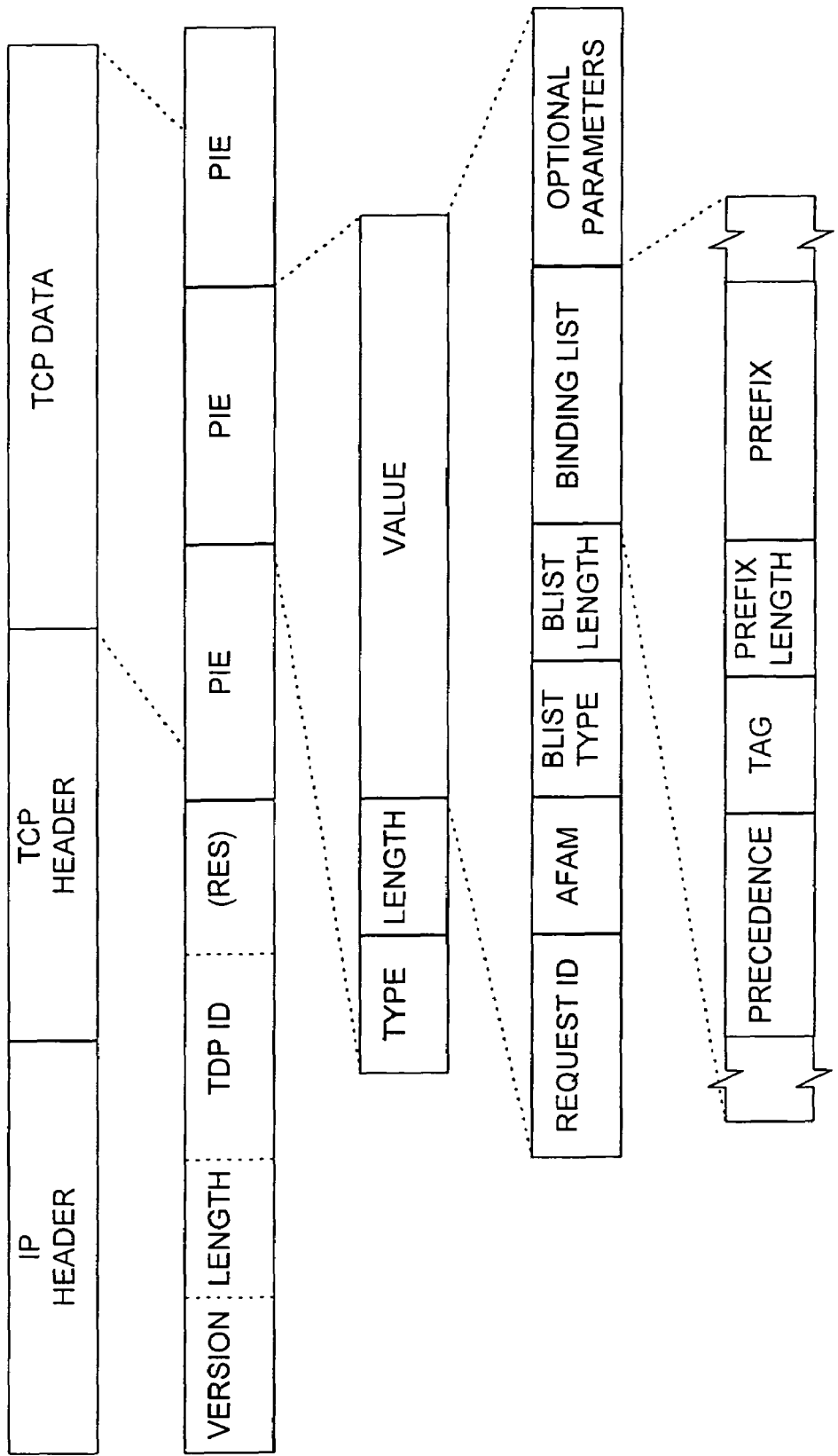
FIG. 3 is a diagram of the environment and format of a tag-distribution-protocol protocol data unit.

TDP is a two-party protocol. It requires a connection-oriented transport layer that provides guaranteed sequential delivery. FIG. 3's second row therefore depicts TDP's protocol data units (PDUs) as being carried in a data stream delivered by the well-known Transport Control Protocol (TCP) whose segments are delivered in Internet Protocol (IP) datagrams whose format FIG. 3's first row depicts. (That row omits the link-level-protocol header and trailer fields that usually encapsulate the IP datagram for transmission between hosts on the same link.)

The IP datagram begins with a header that includes various types of information such as the datagram's length, the network address of the destination host interface, and a code for the next-higher-level protocol in accordance with which the destination host should interpret the datagram's payload. In the illustrated example, that protocol is TCP, which handles matters such as ensuring that data have been received reliably. As the drawing illustrates, the destination host's TCP process interprets the first part of the IP field as a header used in carrying out these TCP functions. In particular, that header includes a field that specifies the "port" application that is to receive the TCP segment's remainder, payload portion. In the case under consideration, the port field indicates that the host's TDP application is to receive it.

Concatenation of TCP-segment payloads results in a data stream that contains the TDP PDUs.

A TDP PDU begins with a fixed-length four-field header. The header's two-byte version field gives the number of the TDP version that the sender is using. The two-byte length field gives the length in bytes of the remainder of the PDU; i.e., it gives the total PDU length minus four.

As will be explained shortly, TDP communications occur in sessions, of which a given router can be conducting more than one at a time. The first four bytes of the six-byte TDP ID field encode an IP address assigned to the router that started the TDP session, and the TDP ID field's last two bytes identify the particular session.

A two-byte field reserved for further enhancements completes the header, and the remainder of the PDU comprises one or more protocol information elements (PIEs), which take the type-length-value format that FIG. 3's third row illustrates.

Each PIE's type field specifies its purpose, while its length field gives the length of its value field. Various PIE types have housekeeping purposes, such as instituting a TDP session between two routers, negotiating protocol versions, providing error notifications, and keeping the session alive. (If a router does not receive a same-session communication within a certain timeout period, it ends the session and discards the tags installed during is the session.) But the protocol's main mission, i.e., distributing tag bindings, is carried out by PIEs of the TDP_PIE_BIND type, for which the type field's contents are $0200_{16}$.

FIG. 3's fourth row depicts this PIE type's value segment. In that segment the request-ID field is zero unless the PIE is being sent in response to a request from the other session participant, in which case that field's request ID matches that of the request. (Such a request would have been sent as another PIE type.) The AFAM (Address Family Numbers) field is set to 1, indicating that the address prefixes contained in the PIE's binding list are intended to be interpreted as IP version 4 (IPv4). If either the sender or the receiver of this PIE is using ATM switching hardware to implement the tag switch forwarding path, the Blist Type field is set to 6 ("32-bit downstream assigned VCI tag") to indicate that, as will be seen below, the tag has a format and location specific to the ATM protocol. Otherwise it is set to 2, which means "32-bit downstream assigned." Down-stream assigned means that a tag's meaning is being set by the router that will base its routing decisions on it, as opposed to the router that will tag the packet with it. The next, Blist Length field gives the length in bytes of the Binding-List field, and the optional-parameters field is sometimes included to present related information.

Of these fields, the field of most interest here is the Binding-List field, whose format FIG. 3's fifth row depicts. That field contains one or more entries. When the Blist Type is 2, each of the entries includes precedence, tag, prefix-length, and prefix fields, as FIG. 3's fifth row indicates. To bind tag T to prefix X, the prefix-length field contains X's length in bits, the prefix field contains X's value right padded with as many bits as needed to make it end on a byte boundary, and the precedence field is an eight-bit field that specifies the precedence with which the router that issued the PDU will service traffic that bears T as a tag.

So to request that a neighbor router use a given tag value when it forwards packets destined for a given prefix, a router sends a TDP message containing a TDP_PIE_BIND type PIE whose binding-list portion's tag and prefix fields respectively contain that tag and prefix.

Now, PE1 uses this mechanism to ask that P1 bind to PE1's own address a distinguished tag value that means "pop the tag stack." (It makes a similar request to any other of the SP's transit routers to which it is directly connected.) The purpose of this request is to establish PE1, an edge router, as one that should see the lower, ultimate-destination-designating tag (T3 in FIG. 1) hidden from the transit routers. As a result of PE1's having advertised its host route, P1 already has an FIB entry that maps PE1's address to a next hop of PE1 and a tag-stack operation of "no op." As was stated above, the SP's routers are required to create TIB entries for all prefixes that they have FIB entries for, so P1 assigns a tag T1 to PE1 by creating a TIB entry that maps T1 to the destination PE1. And, in accordance with PE1's bind request, that entry's tag-stack operation is "pop the stack."

P1 must also distribute the new tag, so it uses TDP to ask that P2 use the T1 tag whenever it sends P1 a packet destined for PE1.

PE1's advertisement of its host route has resulted in P2's already having a FIB entry that maps PE1's address to a next hop of P1 and a tag-stack operation of "no op." P2 now modifies this FIB entry so that the tag-stack operation is "push T1."

Since PE1 is a destination in P2's FIB, P2 must bind a tag value to PE1's address. That is, it creates a TIB entry that maps T2 to a next hop of P1—i.e., to its FIB's next-hop entry for PE1—and to a tag-stack operation of "replace the top tag value with T1." P2 then uses TDP to ask that PE2 use tag value T2 whenever it sends P2 a packet destined for PE1.

PE2 already has a FIB entry that maps PE1's address to a next hop of P2 and a tag-stack operation of "no op." In response to P2's TDP message, PE2 now modifies this FIB entry so that the tag-stack operation is "push T2."

3. EBGP Messages from CE Routers to PE Routers

So far we have described only the tag binding that results from the routing information that the SP's routers have used an IGP to share with each other. But the present invention is intended to be used to implement a peer-model VPN, so the client enterprise, too, shares routing information with some of the SP's routers.

The CE1 router is a routing adjacency of the PE1 router. That is, when CE1 forwards a packet destined for a remote system that can be reached through PE1, CE1 explicitly directs that packet to PE1. In the illustrated example as it will be elaborated on in connection with FIG. 2, it performs the explicit direction by encapsulating the packet in a link-level header containing PE1's hardware address on a common multinode network. In other configurations, it may do so by, for instance, placing that packet on a point-to-point link with or by sending the packet in transmission cells whose headers include a code that represents a channel between CE1 and PE1. Yet another way of providing the explicit direction is to use, e.g., encapsulated IP, whereby the packet includes an IP datagram whose destination address is PE1's network address but whose payload is another IP datagram, this one having the destination address of the remote destination. In this way, an internetwork route between CE1 and PE1 acts as a "link" in a higher-level internetwork route.

In contrast, CE1 is not in general a routing adjacency of CE2. That is, even when CE1 forwards a packet destined for a remote system reachable through CE2, it never explicitly specifies CE2 as a router through which the packet should pass on the way. True, the fact that CE2 is in the route may have been included in the reachability information that CE1 amassed in the course of filling its forwarding-information database. But in the course of actually forwarding a packet, CE1 simply notes that PE1 is the next hop to the ultimate destination.

In the FIG. 1 topology, suppose that CE1 is to tell PE1 which hosts are reachable at its site. For this purpose, it must use an external routing protocol, and we have assumed for the sake of example that it uses BGP. Together with RFC 1655, RFC 1654 and its predecessors describe that protocol's operation exhaustively, and we will not repeat that description here. For present purposes, we mention only a few features of most interest to the illustrated embodiment's operation.

Figure 4:
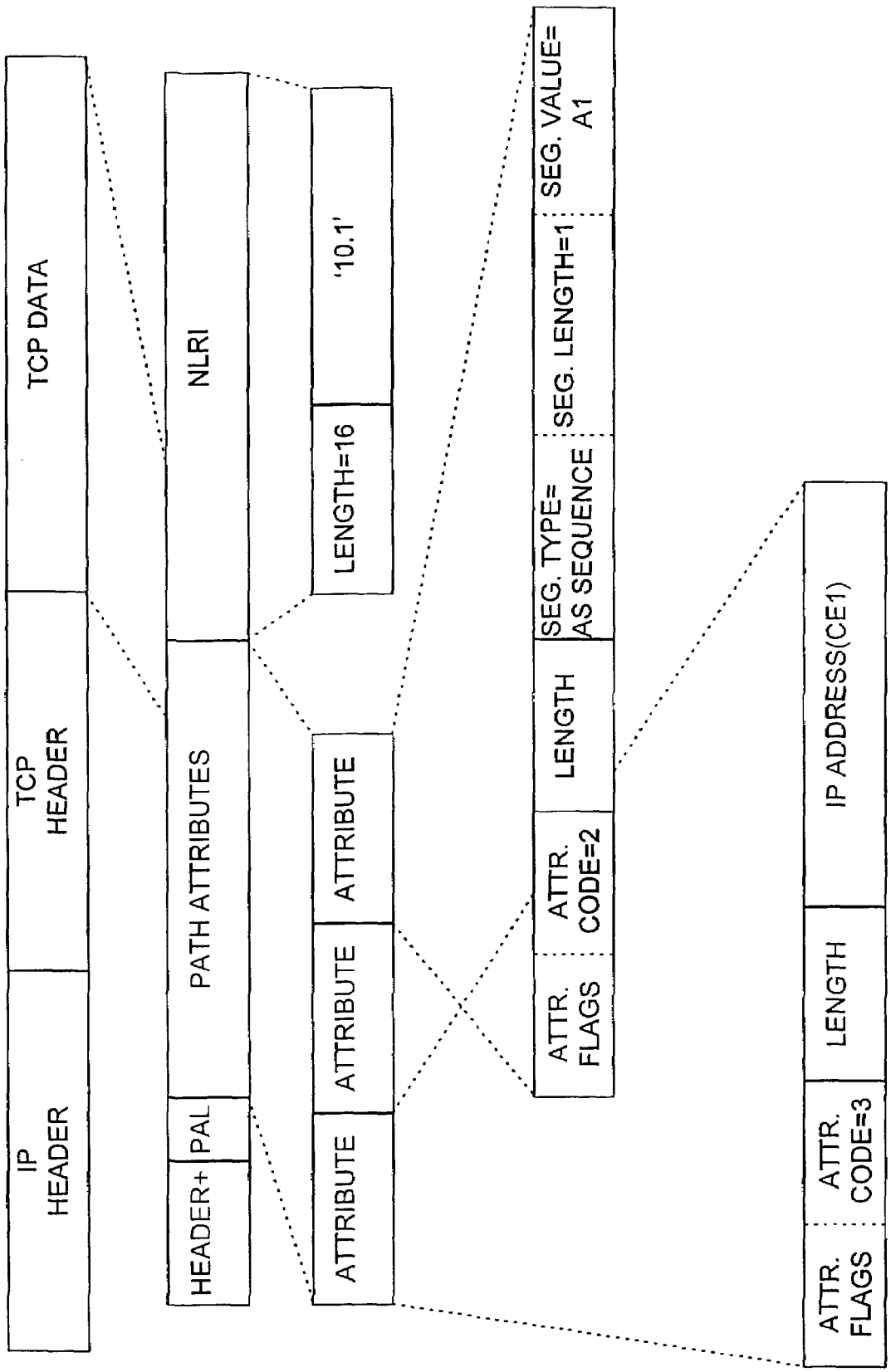
FIG. 4 is a diagram that illustrates the format of a conventional Border Gateway Protocol protocol data unit and its environment.

As FIG. 4's first row indicates, BGP uses the TCP transport protocol. Concatenation of TCP-segment payloads results in a data stream in which the BGP application looks for a predetermined marker sequence. It interprets the marker and subsequent fields as a BGP message header that contains information such as the message's length and type. To share routing information, the type of message that CE1 uses is the BGP "Update" message, whose format FIG. 4's second row depicts.

The drawing uses a section labeled "header+" to represent the header and a number of fields not of particular interest to the present discussion. The message ends with a list of interface address prefixes referred to as Network-Level Reachability Information (NLRI), and a Path Attributes field describes a path to hosts whose IP addresses begin with those prefixes. A Path Attribute Length field ("PAL" in the drawing) tells how long the Path Attributes field.

In the present example, let us suppose that CE1 is at a site where all the hosts have IP addresses whose first byte is 10 ($0A_{16}$) and whose second byte is 1 ($01_{10}$). That is, they can be represented by the two-byte prefix $0A01_{16}$ (which the literature conventionally represents as "10.1.") To communicate this, CE1 places in an NLRI-field length segment an indication that the prefix to follow is two bytes in length, and it puts $0A01_{16}$ in the following, prefix field, as FIG. 4's third row indicates.

FIG. 4's third row depicts the message's path-attributes portion as having three attribute fields, of which FIG. 4's fourth row illustrates one in detail. Attribute fields take the <type, length, value> form. The type field's second, "attribute code" half is shown as containing the code value of 2, which indicates that the value field is to be interpreted as describing a path to the hosts that the message advertises as being reachable. Specifically, it is to be interpreted as listing the "autonomous systems" that have to be traversed to reach those hosts.

Now, whenever a system has a BGP connection of any sort, it must use an Autonomous System Number (ASN). This is a number that the assigned number authority issues so that independently administered systems can identify each other when they use an external routing protocol. An "autonomous system" (AS) is a system under administration separate from others, and connection among an AS's hosts, whether direct or indirect, must be possible by way of the AS's resources only. Since CE1 cannot communicate with CE2 without using the SP's resources, the customer-enterprise-administered resources comprise at least two ASs. So we will assume that CE1's ASN is A1, CE2's ASN is A2, and the PE routers' ASN is A3.

From PE1, only AS A1 is involved in reaching the hosts represented by prefix 10.1. To indicate this, the AS-path attribute's value includes a first field that identifies it a sequence of ASs, a second field that gives the number of ASNs in the list as one, and a third field that contains the list's sole ASN, A1.

FIG. 4's fifth row depicts another of that message's attribute fields, one whose attribute-code byte identifies it as specifying the "next hop" to be used in reaching the advertised host-address range. The value field contains CE1's address, thereby indicating that CE1 can forward traffic to those reachable destinations.

So CE1 has told PE1 that it undertakes to forward traffic to hosts whose IP address prefixes are 10.1. In response, PE1 assigns a tag, T3, to that address prefix in CE1's VPN, VPN V. (Actually, PE1 may use the same tag value for every address prefix mentioned by CE1.) In its TIB, PE1 creates an entry, indexed by this tag value, that specifies CE1 as the next hop. The entry specifies a tag-stack operation of "pop the tag stack" so that the tag used will be discarded to reveal the network-layer header to CE1.

4. IBGP Messages from PE1 to PE2

Additionally, PE1 sends BGP update messages to certain other of the SP's routers to tell them that they can forward to PE1 any packets destined for hosts whose addresses are in the 10.1 range. But PE1's SP network provides service to other customer enterprises that may also have 10.1-prefix hosts: those hosts' addresses may not be unique. So the SP assigns a different VPN identifier to each of its customers' VPNs. In the case of CE1's enterprise, let us assume that the code is a 16-bit identifier V. PE1 prepends the VPN identifier V to the IPv4 address prefix (10.1 in the example) and uses it in the BGP message to the other provider routers.

Indeed, the SP may assign VPN V more than one VPN identifier. A reason for doing so could arise if VPN V uses the SP not only as its backbone but also as its connection to outside systems, such as the SP's other customers or the public internet. In addition to the above-described reachability advertisement, which VPN V does not intend the SP to share with systems outside the VPN, CE1 or another of VPN V's edge routers could also send PE1 information regarding routes over which VPN V would permit out-side-origin traffic. For example, one route to a given node may be shorter and thus preferred for traffic from within the VPN, but a different route to the same node may include a firewall and therefore be preferred for traffic from outside the VPN. CE1 could specify the permitted scope of dissemination by using, say, the BGP communities attribute (RFC 1997) in the update message, or it could distinguish between different dissemination scopes by using separate channels between it and PE1 (e.g., by using different ones of PE1's IP addresses) for the different scopes.

PE1 must make this distinction in BGP messages that it sends to others of the SP's routers, because the roles of various SP routers as edge and transit routers is not in general the same for intra-VPN traffic as they are for inter-VPN traffic. To distinguish between different routes to the same destination, PE1 may prepend a first VPN identifier, say, $V_I$, to prefixes in routes intended only for intra-VPN advertisement and a second identifier, say, $V_E$, to prefixes in routes whose extra-VPN advertisement is permitted. Further identifiers may be used for further dissemination scopes. For the sake of discussion, though, we will assume that VPN V uses the SP as its internal backbone only and that the SP has accordingly assigned VPN V only one VPN identifier.

In the illustrated system, transit routers do not need the reachability information that CE1 has shared with PE1. So PE1 does not send the BGP message to the transit routers, and it may not send it to all edge routers. But FIG. 1 depicts only one other edge router, router PE2, and PE1 does send the BGP message to PE2, because that router is connected directly to VPN V. Those skilled in the art will recognize, though, that the message does not have to be sent as part of an actual BGP session between PE1 and PE2. In some large service providers, it is not considered practical for each BGP speaker to maintain BGP sessions with all other BGP speakers. So "route reflectors" act as intermediaries, maintaining sessions either directly or through other route reflectors with each of the BGP speakers and thereby propagating the necessary routing information. In that way, the number of IBGP sessions increases only linearly with the number of BGP speakers. But the diagram shows only two PE routers, so it includes no route reflectors.

Figure 5:
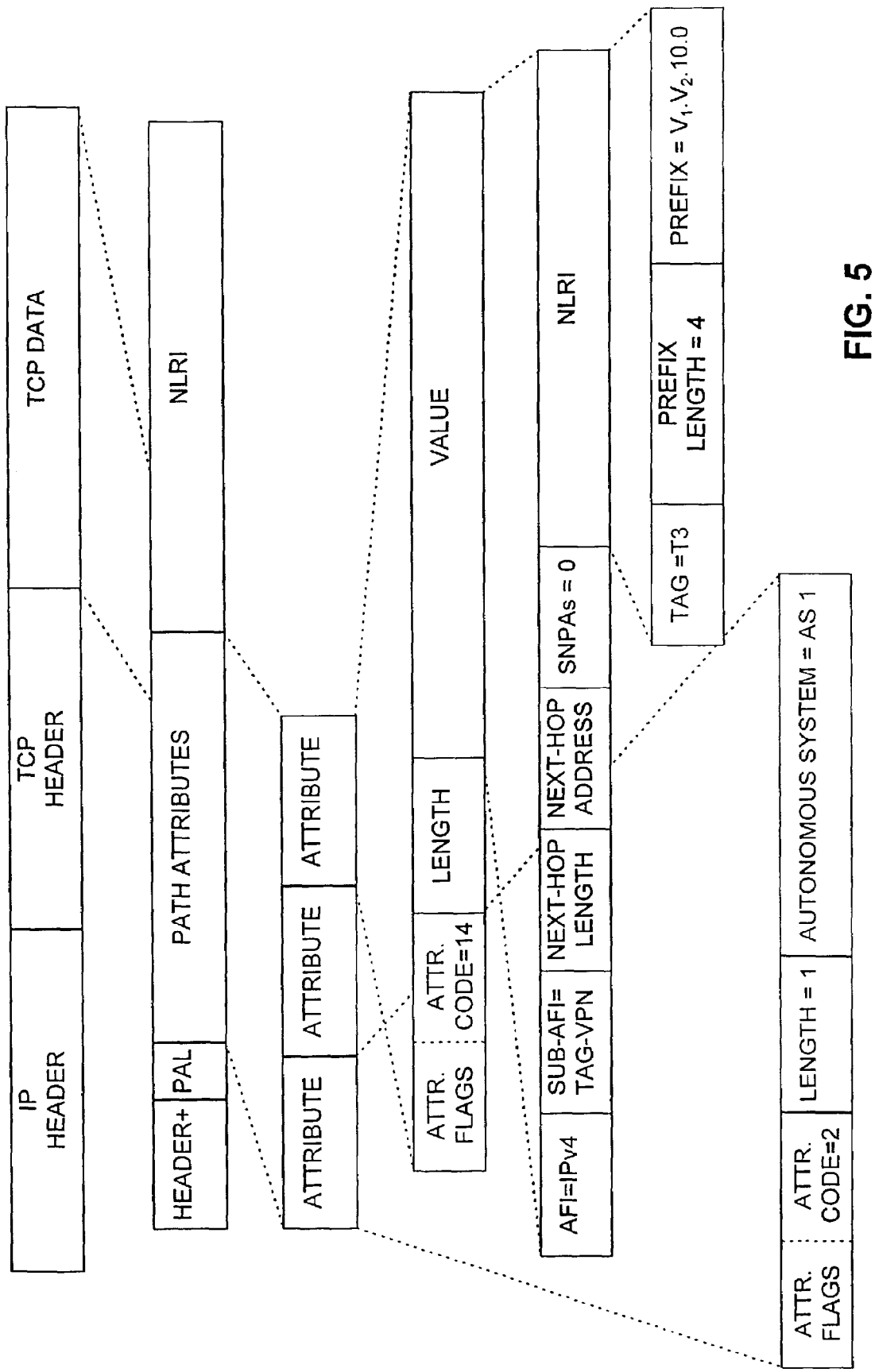
FIG. 5 is a diagram that illustrates the format and environment of a Border Gateway Protocol protocol data unit used to distribute VPN-distinguishing reachability information and tags.

Regardless of how PE1 sends the message, FIG. 5 illustrates that message's format. Since it is a BGP update message, its format is similar to the one that CE1 sent to PE1. Instead of using the conventional NLRI field to contain reachability information, though, PE1 obtains the greater format flexibility needed for the VPN-IPv4 address by using a "multiprotocol reachability information" type of attribute field, which has its own NLRI subfield. As FIG. 5's fourth row indicates, this type of attribute's code is 14. The first three octets of this type of field specify the address family that the attribute value will use to represent the reachability information in the NLRI field, and FIG. 5's fifth row shows that PE1 assigns these bytes a value representing the Tagged VPN-IPv4 format. As FIG. 5's sixth row illustrates, the Tagged VPN-IPv4 format starts with a four-byte tag, whose value is T3 in the example. This is followed by a field representing the prefix-field length, which is four bytes in the example. The prefix field's first two bytes encode the value V, which identifies the VPN, and the second two bytes have the value $0A01_{16}$, i.e., the sixteen-bit address prefix 10.1.

The other fields that FIG. 5's fifth row depicts include a next-hop field and a field that tells how long the next-hop field is. The next-hop field contains a six-byte VPN-IPv4 address whose first two bytes are zero—the next hop is not one of the customers' routers—and whose remaining four bytes are PE1's IP address. Appendix C describes messages of this general type in more detail.

In response to this message, PE2 extracts the NLRI field's VPN-IPv4 value and decodes it into a VPN identifier and an IPv4 address prefix. In its FIB for that VPN, it creates an FIB entry that maps the IPv4 prefix to a next hop and a tag-stack operation. The next-hop value is PE1's address (since PE1's address appeared in the message's next-hop field). The tag-stack operation is "push tag value T3 onto the tag stack." Since PE1 is not a direct neighbor of PE2, this is a recursive FIB entry.

Note also that BGP Update messages concerning VPN-IPv4 address prefixes cause modification only of the VPN-specific FIB, not of the general FIB. However, if the original BGP message from CE1 had indicated that the reachability information could be disseminated beyond VPN V (or a broader dissemination scope could be inferred from, e.g., the channel by which it came, then PE2 would additionally install that IPv4 prefix, next hop, and tag-stack operation in the FIBs for all the VPNs to which that information's dissemination.

Although the illustrated embodiment employs only a single service provider to provide the VPN's backbone, there is no reason why more than one SP, whose facilities constitute more than one autonomous system, cannot cooperate to implement the present invention's teachings. In that case, the tag-binding and reachability information would further flow from one SP to the next by EBGP in the FIG. 5 format.

Specifically, the egress PE router in one of the SP networks could use BGP to distribute a tag binding for a particular VPN-IPv4 address to the BGP border router between the two SP networks. That BGP border router would then distribute a tag binding for that address to the ingress PE router.

5. EBGP Message from PE2 to CE2

Figure 6:
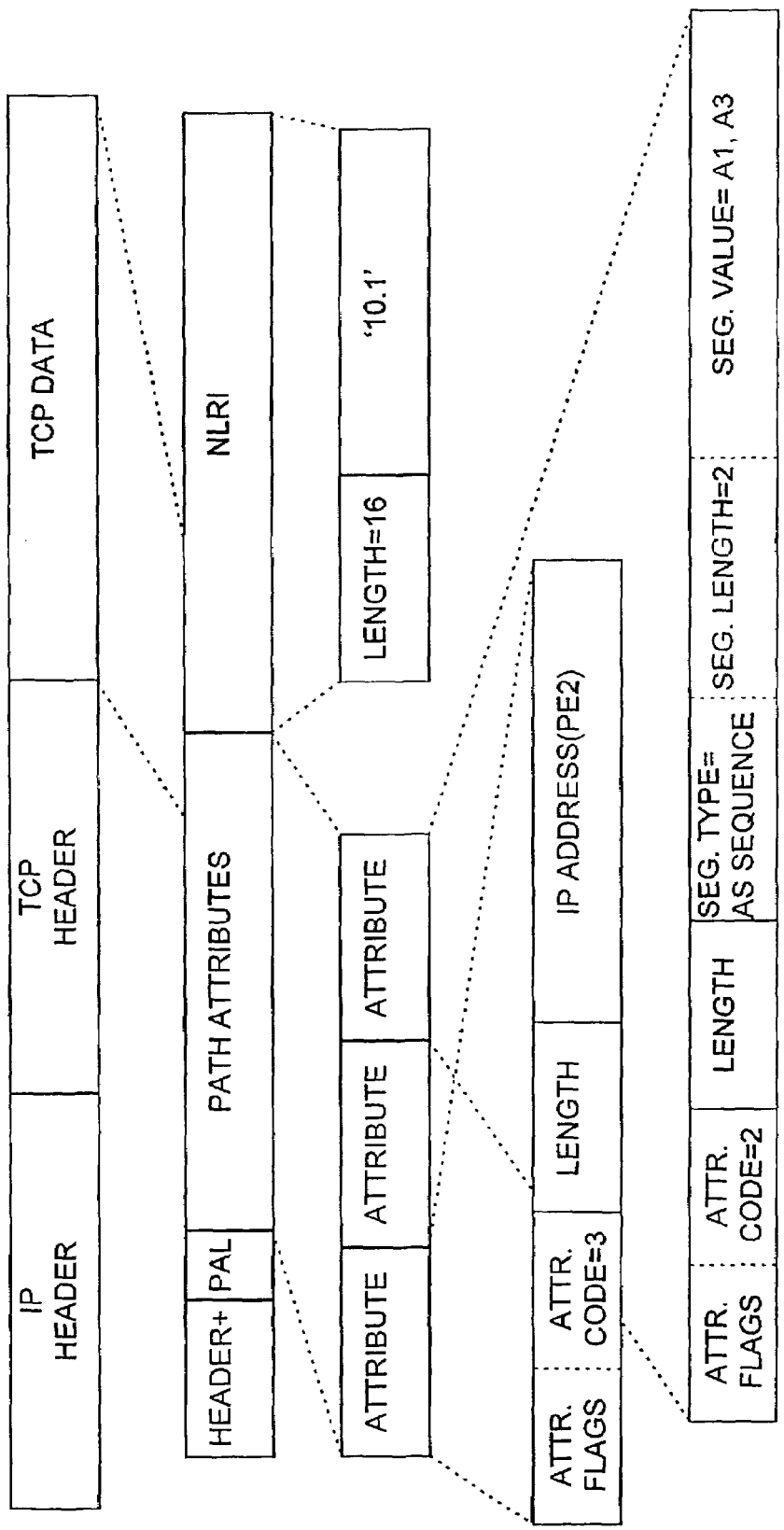
FIG. 6 is a diagram that illustrates the format of another conventional Border Gateway Protocol protocol data unit and its environment.

PE2 then relays this information to CE2 by sending it an EBGP message similar to the one that CE1 sent to PE1. As FIG. 6 shows, this message's NLRI field indicates that hosts whose addresses begin with prefix 10.1 are reachable, its next-hop attribute field indicates that the next hop in the route to those hosts is PE2, and the AS-path attribute field indicates that the path to that prefix traverses autonomous systems A1 and A3.

When CE2 receives this message, it creates an FIB entry that maps prefix 10.1 to a next hop of PE2. Note that CE2 need not support tag switching. CE2 must also use its own IGP to inform other routers (not shown) at its site that it has a route to hosts whose addresses begin with prefix 10.1.

6. Tracing a Data Packet

As a result of these operations, the various routers have the routing information that they need when CE2 sends to PE2 a data packet P whose destination address is 10.1.0.1, which FIG. 1 depicts as "D1"

To send P, CE2 looks up address 10.1.0.1 in its FIB and finds that the longest matching address prefix is the sixteen-bit prefix 10.1. The corresponding next hop is PE2. CE2 is directly attached to PE2, so it forwards P to PE2 over the data link connecting the two routers.

PE2 receives packet P and notes that it received that packet from a particular VPN, VPN V. For the sake of simplicity, we assume that PE2 concludes this from the fact that it receives the packet over a point-to-point interface dedicated to communication with CE2. But edge routers can base that determination on other factors instead. For example, suppose that the interface the interface is a local-area-network interface over which packets from different VPNs could arrive. In that case, CE2 might rely on the data-link source address and base the determination on its knowledge of the VPN's constituent systems. Other implementations may base the source determination on cryptographic authentication data that the packet contains. In a similar vein, the log-in procedure performed by a customer contacting the PE router by way of a dial-in link may result in the PE router's obtaining information from an authentication server, and it may base its identification of the source VPN on this further information.

In any event, the PE router identifies the source VPN, and the source VPN in this case is VPN V. So PE2 looks up P's destination address in its FIB that is specific to VPN V. It finds that the longest matching address prefix is the sixteen-bit prefix 10.1. (In this example, which focuses on intra-VPN communication, we assume that PE2 further infers from the source determination that the packet is not to be permitted outside VPN V, so PE2 would not look further if it failed to find a match. In other circumstances, though, PE2 might look in the FIBs of other VPNs, which may have indicated their availability to forward packets to that address.) The corresponding next hop is PE1, and the tag-stack operation is "push T3 on the tag stack." So PE2 creates a tag stack for P and pushes T3 onto it. Since PE2 is not directly connected to PE1, P2 performs a recursive lookup in its general FIB.

We know from the preceding discussion that PE2 has an FIB entry corresponding to PE1's thirty-two-bit address, that the next hop in that FIB entry is P2, and that the tagstack operation in that FIB entry is "push T2 onto the tag stack." So PE2 pushes T2 onto P's tag stack. The stack now has two tags; the top tag T2, and the bottom tag is T3. PE2 tags P with this stack and sends P over the data link to P2, as FIG. 1 shows diagrammatically.

When P2 receives packet P, it attempts to forward it by looking up T2 in its TIB. From the tag-distribution discussion, we know that T2 maps to a TIB entry whose next hop is P1 and whose tag-stack operation is "replace the top tag value with TI." So P2 performs the tag-stack operation and sends the packet over the data link to P1. (At this point, packet P's top tag is T1, and its bottom tag is T3.)

When P1 receives packet P, it attempts to forward it by looking up T1 in its TIB. We know from the tag-distribution discussion that T1 maps to a TIB entry whose next hop is PE1 and whose tag-stack operation is "pop the tag stack." So P1 performs the tag-stack operation and sends the packet over the data link to PE1. (At this point, packet P is carrying only one tag, T3.)

When PE1 receives packet P, it attempts to forward it by looking T3 up (which is now at the top of the stack) in its TIB. We know from the tag-distribution discussion that T3 maps to a TIB entry whose next hop is CE1 and whose tag-stack operation is "pop the tag stack." So PE1 performs the tag-stack operation and sends the packet over the data link to CE1. Note that PE1 has popped the last tag off the tag stack before sending the packet to CE1. So CE1 receives an untagged packet, which it forwards in the conventional way.

Now, although we introduced the foregoing example with FIG. 2's illustration of Ethernet as the link-level protocol, those skilled in the art will recognize that other protocols can readily be substituted. The adaptations required for that purpose are largely straightforward and do not in general require separate discussion. But there may be some value in briefly discussing an Asynchronous Transfer Mode (ATM) example, because such an adaptation moves part of the tag stack to the ATM header.

Figure 7:
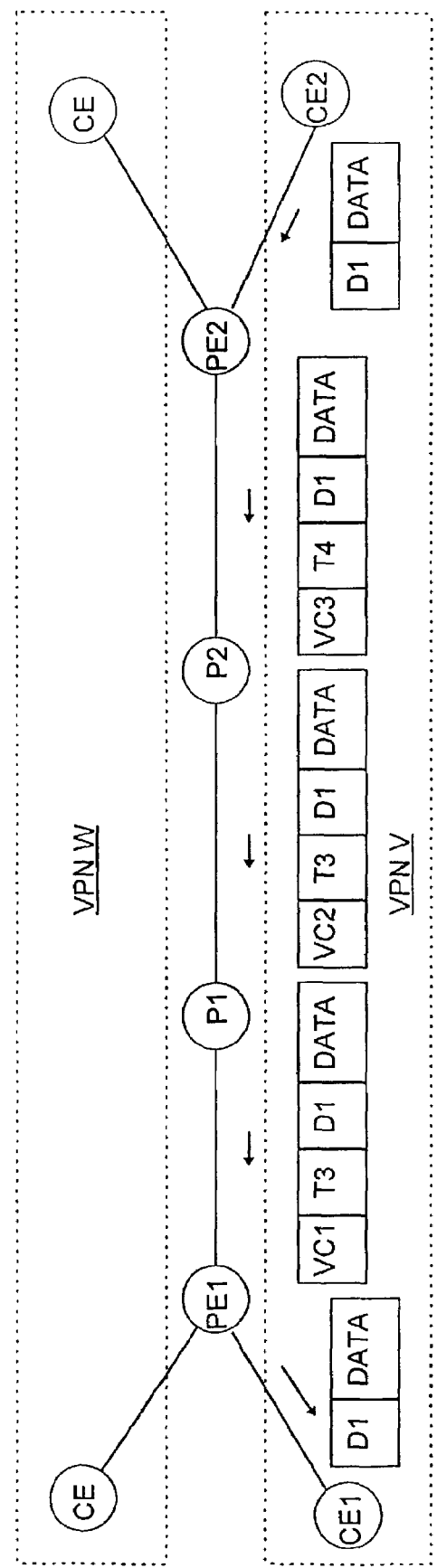
FIG. 7 is a topological diagram of a VPN that employs ATM switches in implementing the present invention's teachings.
Figure 8:
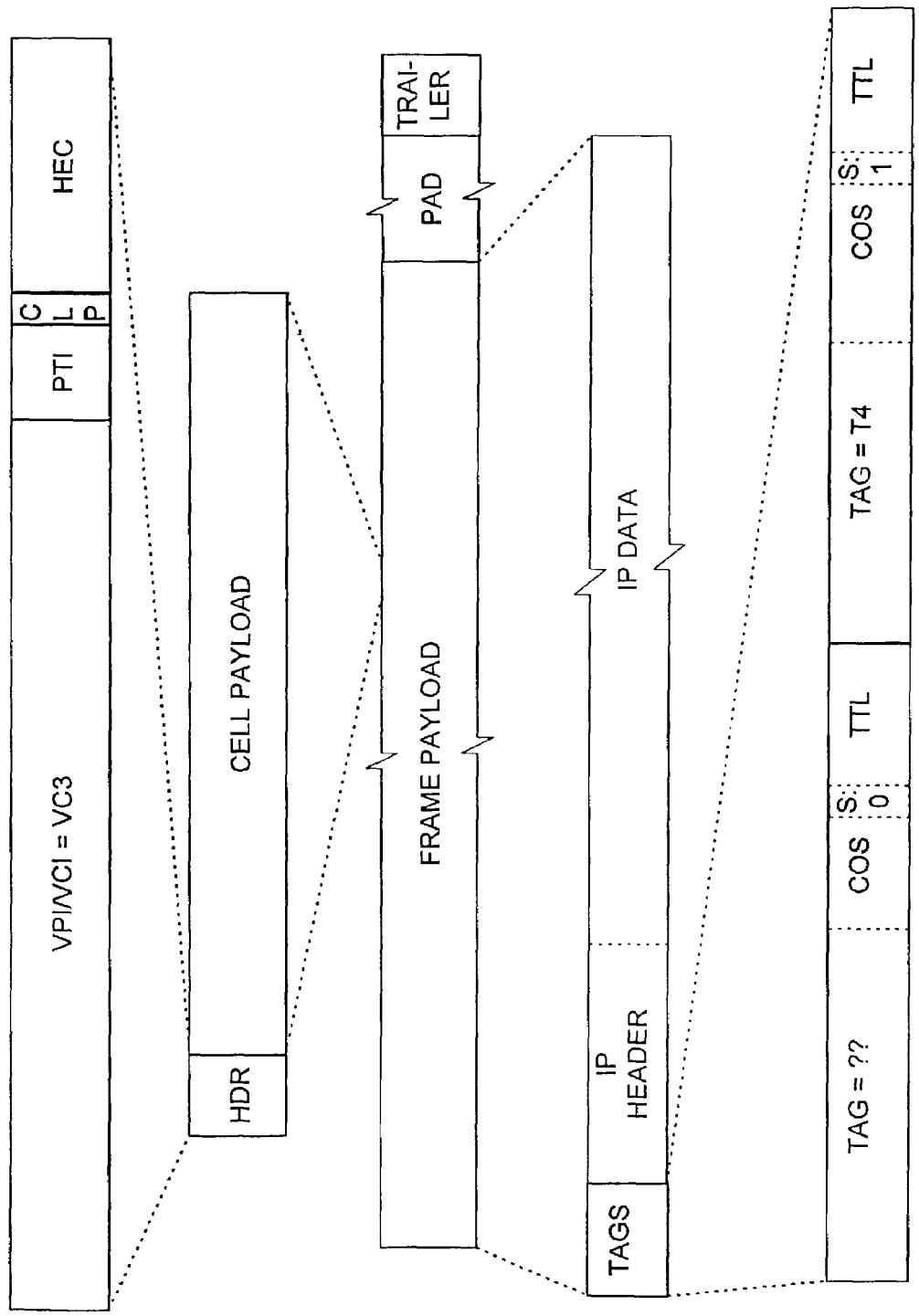
FIG. 8 is a diagram of an ATM frame used in the FIG. 7 embodiment.

To that end, we consider FIG. 7, whose topology is identical to that of FIG. 1, but we assume that P1 and P2 are ATM switches and that PE1 and PE2 are routers that attach to P1 and P2, respectively, over ATM interfaces. FIG. 8 depicts the typical data message that, say, PE2 would send to P2 in such an arrangement. FIG. 8 is best understood by comparison with the second row of FIG. 2's Ethernet example. In that diagram, the Ethernet header (DEST. ADDRESS, SOURCE ADDRESS, and TYPE) and trailer (CRC) encapsulate a payload in the form of tag fields and an IP datagram. FIG. 8's third row depicts an ATM frame, and that drawing's fourth and fifth rows show that the frame's payload is similar to that of FIG. 2's Ethernet frame. The only difference in the payloads is that FIG. 8's fifth row represents the left (top) tag by question marks, which indicate that the top tag's contents do not matter.

The reason why they do not is that the routing decisions made by FIG. 1's P2 on the basis of those contents are made by FIG. 7's (ATM) router P2 on the basis of an ATM VPI/VCI field in the header of an ATM "cell." From the point of view of an ATM client, the frame of FIG. 8's third row is the basic unit of transmission, and it can vary in length to as much as 64 Kbytes of payload. (Those skilled in the art will recognize that there are also other possible ATM frame formats, but FIG. 8's third row depicts one, known as "AAL5," that would typically be employed for user data.) For communication between ATM switches, however, ATM actually breaks such frames into fixed-size cells.

Each cell consists of a header and a payload, as FIG. 8's second row illustrates. Among the purposes of the header's PTI field, depicted in FIG. 8's first row, is to indicate whether the cell is the last one in a frame. If it is, its last eight bytes form the frame trailer field that FIG. 8's third row depicts. Among other things, the trailer indicates how much of the preceding cell contents are actual payload, as opposed to padding used to complete fixed-size cell.

The only other header field of interest to the present discussion is the VPI/VCI field of FIG. 8's first row. As is well known to those skilled in the art, ATM systems organize their routes into "virtual channels," which may from time to time be grouped into "virtual paths." Each switch associates a local virtual path/virtual channel indicator (VPI/VCI) with a channel or path that runs through it. When an ATM switch receives a cell, it consults the cell's VPI/VCI field to identify by table lookup the interface by which to forward it, replaces that field's contents with a value indicated by the table as being the next switch's code for that path or channel, and sends the resultant cell to the next switch. In other words, the function performed by the VPI/VCI field enables it to serve as the stack's top tag.

So PE1 will bind a VPI/VCI tag, call it VC1, to the address of PE1 and distribute that binding to P1. P1 will bind a VPI/VCI tag, call it VC2, to the address of PE1 and distribute that binding to P2. P2 will bind a VPI/VCI tag, call it VC3, to the address of PE1 and distribute that binding to PE2.

Now, when PE2 receives from CE2 a packet destined for a site that is in CE2's VPN and is reachable via CE1, it does the following.

First, it looks up the destination address of that packet in its VPN-specific forwarding table. It finds a recursive entry whose tag operation is "push on T3". On performing the recursive lookup, it finds that the next hop is an ATM switch and that the tag value is the VPI/VCI value VC3. It accordingly forms the frame depicted in FIG. 8's bottom three rows. It then breaks the frame into cells of the type that FIG. 8's top two rows depict, placing the VC3 value in the VPI/VCI field, and sends them in sequence to P2.

P2, on a cell-by-cell basis, replaces VC3 with VC2 and forwards the resultant cells to P1. Similarly, P1 replaces VC2 with VC1 on a cell-by-cell basis and forwards the resultant cells to PE1. PE1 eventually collects all the frame's cells and reassembles them. PE1 then extracts the resultant frame's user data, pops the tag stack, and forwards the resultant frame in accordance with the resultant tag stack (which now contains a single tag, T3). Note that in this scenario it is PE1, not P1, that pops the stack to get to the tag, T3, that indicates the extra-SP route. This is because P1 in this scenario is an ATM switch, and ATM switches do not have the capability of popping the stack themselves.

In the foregoing ATM example, the top tag in the tag-stack field never has any meaning. But now suppose that only P1 is an ATM switch: P2 and PE1 are routers attached to P1 via ATM interfaces. Then the PE2-P2 link would contain FIG. 2-*style* packets, P2 would base its decision on the top tag-field tag, and it would forward ATM cells in response.

Considerations for Extension to Inter-VPN Use

The foregoing discussion focused mainly on intra-VPN communication. We now turn to the way in which systems that employ the present invention's teachings can perform inter-VPN communication.

1. Internal vs. External VPN-IPV4 Addresses

As was explained above, it may be necessary to maintain two routes to a particular IPv4 address exported from one VPN to another. One route is used for intra-VPN traffic, and the other is used for inter-VPN traffic. When a particular IPv4 address is exported from one VPN to another,. For example, suppose that the system bearing a particular address is in site S1. Intra-VPN traffic to that system should certainly go directly to S1. However, there may be a firewall located at site S2, and it may be desired to pass all inter-VPN traffic through that firewall. In this case, inter-VPN traffic to the system in question should travel via S2.

In order to be sure that BGP can simultaneously install an intra-VPN and an inter-VPN route to the same address, it is necessary to use a different VPN-IPv4 address for intra-VPN connectivity than for inter-VPN connectivity.

Therefore, each VPN will have two VPN IDs. One will be the "Internal VPN ID," and one will be the "External VPN ID."

Each PE router will translate the IPv4 addresses from its attached VPNs to one or the other or to both of these VPN-IPv4 addresses. The rules for doing so will be discussed later.

A VPN-IPv4 address whose VPN ID is the Internal VPN ID of its VPN must not be distributed by any PE router to any CE router, unless that CE router is in that VPN. To prevent any unintended redistribution, a PE router that distributes an IPv4 address to another PE router must assign it the NO_EXPORT Community Attribute. According to RFC 1997, "BGP Communities Attribute," this attribute means:

All routes received carrying a communities attribute containing this value MUST NOT be advertised outside a BGP confederation boundary (a stand-alone autonomous system that is not part of a confederation should be considered a confederation itself).

As we shall see below, this will prevent the corresponding address from being advertised outside the VPN. (One could instead define a new Community Attribute value, e.g., NO_EXPORT_OUTSIDE_VPN, for this purpose, but NO_EXPORT seems adequate and makes it easy to accommodate the case where the CE router itself specifies a NO_EXPORT attribute.

(An alternative would be to install filters that prevent VPN-IPv4 addresses with Internal VPN IDs from being transmitted outside a BGP confederation. This could be done if one could tell by inspection that a particular VPN ID is Internal, rather than External.)

2. Autonomous System Numbers a. ASN Used by PE Routers on IBGP Connections

Since the PE routers (in the same P-network) are to use IBGP to distribute routes among themselves, it follows that there must be some Autonomous System Number (ASN), known to all the PE routers, which they use when setting up these connections. (A BGP connection is not treated as an IBGP connection unless both BGP speakers have used the same ASN.)

If the P-network is already in use as an internet transit network, it will likely already have a globally unique ASN, and this can be used on these IBGP connections.

b. ASN Used by CE Routers on EBGP Connections

When a particular site is a "stub site," it is not necessary for the CE router to talk BGP to the PE router, though under certain circumstances it may be desirable for it to do so. However, whenever a particular site has a C router that is talking BGP to another C router, then the CE router will need to talk BGP to the PE router. This is true whether the C routers talking BGP are talking to other C routers at the site, to other C routers at different sites of the same VPN, to other C routers of different VPNs, or even to routers in the public internet.

When a CE router distributes routing information to a PE router, the intention is that the information ultimately be distributed to one or more other CE routers. One PE router uses IBGP to distribute the information to another, and the latter redistributes it to another CE router.

Since routes learned over IBGP are in general not redistributed over IBGP, and since PE routers have IBGP connections to each other, it follows that the CE routers must talk EBGP to the PE routers. Each site where a CE router talks EBGP to a PE router must have an ASN. Call this a "Site ASN."

The number of globally unique ASNs is limited, and it is not feasible to assign one to each individual VPN site. There is however a "private ASN" numbering space containing 1023 ASNs, which a service provider can administer as he sees fit. So the Site ASNs must be taken from the private ASN space. Since the size of the private ASN space is limited, it is desirable to use the same ASN numbers in different VPNs.

This can be done by modeling each VPN as a "BGP Confederation." This means that the CE router and the PE router do not run "regular" EBGP between them: they run "Confederation EBGP (CEBGP)." CEBGP uses some of the procedures of regular EBGP, some of the procedures of IBGP, and some procedures of its own. However, these procedures are all well-defined and implemented.

3. Using BGP-Confederation Techniques for AS-path Manipulation

A BGP confederation is a set of Autonomous Systems (ASs) that appear as a single AS to all ASs not in the Confederation. Only within the Confederation are the component ASs visible. That is, externally to the Confederation, the Confederation has a single ASN. Within the Confederation, each "Member AS" of the Confederation has its own ASN, which is distinct from the Confederation's ASN. The distinction shows up primarily in BGP Confederation procedures for AS-path manipulation, which we recommend for inter-VPN communication. (This does not imply that BGP Confederation procedures affecting other attributes should also be used.)

BGP maintains loop freedom by associating an AS-path with each route. Roughly, this is a list of the ASs through which a packet must travel to reach the destination. When a router distributes a route via EBGP, it adds its own ASN to the AS-path. When a router receives a route via EBGP, it checks to see if its own ASN is already in the AS-path. If so, it discards the route, in order to prevent the loop.

With Confederations, this procedure is slightly changed. When a router distributes a route on a CEBGP connection, it adds its own AS to the AS-path, but it marks that AS as being within the Confederation. When a router that is within a Confederation distributes a route on an EBGP connection, it first removes from the AS-path all ASs that are marked as being within the Confederation. Then it adds the Confederation's ASN to the AS-path.

When a router that is in a Confederation receives a route over an EBGP connection, it will discard the route if the AS-path contains the Confederation's ASN. When a router receives a route over a CEBGP connection, it will discard that route if the AS-path contains the Member ASN of that router, and that Member ASN is marked as being within the Confederation.

Since the Member ASNs of a Confederation are never-seen outside the Confederation, they can be assigned from the Private ASN space.

In a VPN, each site containing a CE router that talks BGP to a PE router would have a Site ASN taken from the Private ASN space. Then these Site ASNs need be unique only within a single VPN: they can be reused in other VPNs. The P network is part of each such Confederation and needs to have a Member ASN that can be used within each Confederation. The P network can have a single ASN that it uses as its Member ASN in all Confederations. If it has a globally unique ASN, this can be used.

If a VPN spans multiple service providers, then its Site ASNs must be unique across all the providers, and each P network must use a globally unique ASN.

When a router receives a route whose AS-path contains its site number, it conventionally rejects the route if the site number is not marked as being part of the confederation, and it is preferable for CE routers to follow this policy. Otherwise, since a VPN is modeled as a Confederation, care must be taken to ensure that whenever two C routers in the same VPN have a direct BGP connection with each other (i.e., a "backdoor" connection between routers in the same VPN, at the same or different sites), they talk either IBGP or CEBGP, never regular EBGP. When talking CEBGP, each router would use its Site ASN as its ASN, for the purpose of (a) filling in the "My Autonomous System Number" field in the BGP Open message, and (b) adding its ASN to the AS-path.

When a PE router receives from a CE router over a CEBGP connection, routes to IPv4 addresses, the PE router will immediately translate those addresses to VPN-IPv4 addresses, using the Internal VPN ID of the CE's VPN. ("Immediate translation" means that the addresses appear in BGP's "adj-rib-in" table as VPN-IPv4 addresses.) When a PE router distributes VPN-IPv4 addresses to a CE router over a CEBGP connection, it first converts them to IPv4 addresses by stripping off the VPN ID.

The External VPN ID of a particular VPN can have the same value as the VPN ASN. The Internal VPN ID must have a different value. It may be convenient for these values to be algorithmically related, but this is not required.

If a VPN spans multiple service providers, its Internal VPN ID and its External VPN ID must be globally unique. Otherwise, they must be unique only within the scope of a single service provider. Note also that any quantity that is used as an External VPN ID of one VPN may not be used as an Internal VPN ID of any other VPN, and vice versa.

4. Inter-VPN Communication as Communication Between Two Confederations

Since each VPN is modeled as a BGP Confederation, each VPN appears as an AS to each other VPN. Communication between two VPNs is modeled as communication between two ASs, using the P network as the transit AS. Therefore if a CE router uses BGP to export routes, via a PE router, to another VPN, it must do so via a regular EBGP connection to the PE router. Of course, on the EBGP connection it uses the VPN ASN, not the Site ASN.

If the P-network has a globally unique ASN, it can be used both within a Confederation and between Confederations.

Whenever two C routers in different VPNs have a direct BGP connection with each other (i.e., a "backdoor" connection between routers in different VPNs), care must be taken to ensure that they talk EBGP with each other. When talking (non-confederation) EBGP, each router would use its Confederation ASN as its ASN for the purposes of (a) filling in the "My Autonomous System Number" field in the BGP Open message, and (b) adding its ASN to the AS-path.

So in the most general case, a CE router may need to have two BGP connections to a PE router, an EBGP connection (for inter-VPN connectivity) and a CEBGP connection (for intra-VPN connectivity). There may be only one BGP connection between a given pair of IP addresses. So if a given pair of routers need to have two BGP connections between them, each router must use a distinct address on each connection.

When a PE router receives, from a CE router over an EBGP connection, routes to IPv4 addresses, the PE router will immediately translate those addresses to VPN-IPv4 addresses, using the External VPN ID of the CE's VPN. When a PE router distributes VPN-IPv4 addresses to a CE router over an EBGP connection, it will first convert them to IPv4 addresses by stripping off the VPN ID.

A site in a VPN may maintain a backdoor connection to the public internet, via an EBGP connection. If this EBGP connection is not via the same service provider that is providing the VPN, the VPN ASN must be from the public AS numbering space. Otherwise, it may be from the private AS numbering space, and the C router maintaining the EBGP connection to the internet should be configured to strip all private ASNs from the AS-path.

In general, P routers with EBGP connections to routers outside the P network will not accept routes to VPN-IPv4 addresses over those connections. To do so would allow routers outside the Service Provider's control to spoof routes to the VPN, thereby compromising the security that the customer expects. If it is necessary to make any exceptions to this rule (to support, say, multi-provider VPNs), the security effects of those exceptions would need to be carefully considered.

5. How to Determine when a CE Router Needs Zero, One, or Two BGP Connections to a PE Router If the CE router's site does not have any backdoor connections, neither a CEBGP nor an EBGP connection is necessary. In this case, all the information that would be passed via BGP can be statically configured in the PE router. The site will not have a Site ASN. IBGP between PE routers is still used to pass routing information about one site to the others.

By a "backdoor connection," we mean a BGP connection between a C router at the site and any router other than a PE router. If two sites in a particular VPN are interconnected via static routing and/or IGP, then we model them as a single site, rather than as two sites with a backdoor connection.

Even in the absence of backdoor connections, it can be desirable to use BGP between the CE and the PE router, if the site has a significant number of address prefixes that are sometimes up and sometimes down, or if there are address prefixes that move from one site to another. This can also be desirable simply as a way to avoid the configuration task associated with static routing.

If the CE router's site does not have any backdoor connections to other VPNs (or to the public internet), but it is desired to have a BGP connection to the PE router (either for the reason given in the prior paragraph, or because there are backdoor connections to other sites in the VPN), it is necessary to have a CEBGP connection between CE router and PE router. As we will see below, routes distributed over CEBGP will not thereby be distributed to any other VPN. However, distribution of routes to other VPNs can still be achieved via configuration of the PE router.

If the CE router's site has backdoor connections to other VPNs (or to the public internet), and if it serves as a transit network for traffic from other VPNs (or the public internet), then the CE router must run EBGP with the PE router, in order to properly distribute the routes for which it is a transit network.

If a VPN has multiple sites that have EBGP connections to PE routers, then there must also be a CEBGP connection from each of those sites to a PE router.

6. Using Community Attributes to Control the Exporting of Addresses from One VPN to Another As stated previously, whenever a PE router uses IBGP to distribute to another PE router (or route reflector) a route to a VPN-IPv4 address, the NO_EXPORT Community Attribute will be included as an attribute of that route if the VPN ID of that address is an Internal VPN ID.

When a PE router uses IBGP to distribute a route to a VPN-IPv4 address to another other PE router (or route reflector), and the VPN ID of that address is an External VPN ID, Community Attributes must be included that specify the set of VPNs to which the address dress in question is to be exported.

This requires a distinguished class of Community Attributes that are used only for this purpose. In general, when such attributes are received by P routers over EBGP connections, they should be removed (via inbound filtering), unless there is explicit configuration of the P router that allows them to be passed on unchanged.

The Community Attribute that is used to indicate that an address is to be exported to a particular VPN should be algorithmically derivable from that VPN's ASN, and vice versa.

If a CE router talks EBGP to a PE router, the CE router may, with each address it distributes, include a set of Community Attributes, indicating the set of other VPNs (possibly including the public internet) to which the address is to be exported. If so, the PE router may be configured with a set of addresses from the C network that the CE router is authorized to export to a set of other VPNs. In that case, the PE router will remove (via inbound filtering) any unauthorized Community Attributes sent by the CE router. The PE router may be configured with a set of addresses from the C network that are to be exported to a set of other VPNs, even if the CE router does not include the necessary Community Attributes. In this case, the PE router must add (via inbound filtering) the missing Community Attributes.

When a PE router receives a route to an external VPN-IPv4 address and that route is associated with a Community Attribute that identifies the VPN of a CE router to which that PE router is attached, then the route is a candidate for redistribution to the CE router. (Of course, a VPN-IPv4 address is translated into an IPv4 address, by having its VPN ID stripped off, before being distributed to a CE router.)

The PE router may be configured to allow only particular VPN-IPv4 addresses to be distributed to a particular CE router, regardless of the Community Attribute. Or it may be configured to prevent the distribution of particular VPN-IPv4 addresses to a particular CE router, regardless of the Community Attribute. In such cases, outbound filtering should be used to prevent distribution of such addresses to the CE router.

7. A Slightly Different Way to Use Community Attributes: Closed User Groups

The Community Attribute can be used in a similar though somewhat different way to represent "Closed User Groups" (CUGs) of VPNs, rather than target VPNs.

A CUG is a set of VPNs. A CE router could associate a route to a particular address with one or more CUGs. The PE router would strip any CUGs that the CE router is not authorized to use. The PE router could also add additional CUGs, or could add CUGs when the CE router has not specified any. The PE router would need to know which VPNs are members of which CUGs, so it could determine which other PE routers it needs to distribute the routes to.

When a route with a CUG is received, it will be distributed over an EBGP connection to a CE router only if the PE router is configured with the knowledge that the CE router is a member of that CUG.

The use of CUGs may simplify the configuration of the PE routers.

8. IBGP Between PE Router

In conventional uses of BGP, the set of EBGP/CEBGP speakers in a given AS is supposed to be "fully meshed" (or "fully reflected" through route reflectors). Otherwise, there is no way to ensure that communication between any two points is possible. For VPNs, we do not want to require that communication between every pair of points be possible, so the PE routers need not in general be fully meshed. A PE router A needs to talk IBGP to a PE router B only if A and B both attach to CE routers in the same VPN, or if A attaches to a CE router in VPN 1 that is exporting addresses to a VPN 2, and B attaches to a CE router in VPN 2.

For each PE router that is to be an IBGP peer of a given PE router, the given PE router will know which VPNs the peer is interested in. If a PE router A has an IBGP peer B, and B is interested in VPN 1, then A shall distribute a route to B if and only if one of the following two conditions holds:
    the address corresponding to the route is a VPN-IPv4 address in VPN 1, or
    one of the following conditions holds:
        the VPN ID of the VPN-IPv4 address is the Internal VPN ID for VPN 1, or
        the VPN ID of the VPN-IPv4 address is the External VPN ID for VPN 1, and the route has a Community Attribute that indicates that it should be distributed into VPN 1.

Each PE router, before distributing a route, will also assign a tag for that route. This will be encoded, in a way to be defined, as an attribute of that route.

When a PE router redistributes over IBGP a route received from a CE router (whether it is received over EBGP or CEBGP), it should always put itself in as the next hop. This ensures that the next hop is always reachable in the P network's IGP (i.e., it does not require routes to all the CE routers to be injected into the P-networks' IGP). It also ensures proper interpretation of the tag that the PE router assigns to the distributed address prefix; the tag associated with an address prefix should be a tag assigned by the "next hop" for that prefix.

For the purpose of supporting VPNs, PE routers need to support the following capabilities:
    Tag distribution via BGP
    VPN-IPv4 Address Family
    VPN "edge capabilities," i.e., whatever special procedures are needed in order to interact with the CE routers—e.g., translation between VPN-IPv4 and IPv4 addresses, per-VPN lookup tables, etc.

BGP Capability Negotiation, as described in Appendix D, should be used to determine whether an IBGP peer has the appropriate capabilities.

9. IBGP Between a PE Router and a P Router that is not a PE Router

PE routers may have "ordinary" EBGP and IBGP connections that have nothing to do with VPNs. On such ordinary connections, IPv4 NLRI rather than VPN-IPv4 NLRI is used; routes learned from CE routers will not be sent on such connections, unless the PE router is configured to export those routes to the public internet.

Any router with a BGP connection to the internet must ensure, through proper filtering, that it does not leak any routes to the internet that are not part of the P network's AS, or of the AS of some client network of the P network. When routes are leaked to the internet, all private AS numbers must be removed (via outbound filtering) from the AS-path.

10. Configuration of the PE Routers

Each PE router must be configured with the following information:

a. Per CE Router that Attaches to the PE Router
i. The address of the CE router to use when participating in a CEBGP connection.

The PE router may maintain a static route to this address and need not redistribute this address into the IGP of the P network (as long as the PE router always sets itself as the next hop before redistributing routes received from the CE router). In this case, the same address may be reused for other CE routers, subject to the constraint that all the CE routers attaching to a given PE router have distinct addresses. If the PE router distributes this address into the P network's IGP, though, the address should be a unique address in the P network's address space.

This parameter can be omitted if no CEBGP connection is to be formed.
ii. The address of the CE router to use when participating with it in an EBGP connection.

This parameter can be omitted if no EBGP connection is to be formed.
iii. The address of the PE router to use when participating in a CEBGP connection with the above-specified CE router.
iv. The address of the PE router to use when participating in an EBGP connection with the above-specified CE router. (Can be omitted if no EBGP connection is to be formed.)
v. The CE router's Site ASN.

This parameter can be omitted if no CEBGP connection is to be formed.
vi. The CE router's Internal VPN ID.
vii. The CE router's External VPN ID This doubles as its VPN ASN if an EBGP connection is to be formed.

viii. A list of VPNs or CUGs to which the CE router can export addresses, and, for each such VPN, the set of addresses that are authorized to be exported to it.

The set of addresses may be "all." For each such set of addresses, there needs to be an indication as to whether the PE router should allow the addresses to be exported if the CE router attempts to export them, or whether the PE router should initiate the export of the addresses independently of any action on the part of the CE router. (The latter would be the only way to get export if there is no EBGP connection to the CE router.)

ix. A list of VPNs or CUGs that can export addresses to the VPN of the CE router, and, for each such VPN, a set of addresses that are authorized for export into the VPN of the CE router.

This set may be "all." For distribution of an address between the public internet and a VPN, the public internet shall be represented as VPN 0.

b. Per VPN or CUG, for Each VPN to which the PE Router Attaches Via a CE Router, and for Each VPN or CUG to which One of the Attached VPNs Can Export Addresses: the Set of PE Routers Interested in that VPN or CUG IBGP connections will be opened to all such PE routers. If these are provided by only a few route reflectors, manual configuration is acceptable, but auto-discovery will be required as a practical matter if they are provided by a large number of other PE routers.

If the PE router has a CEBGP connection to the CE router, the addresses to be distributed intra-VPN will be those addresses distributed by the CE router over the CEBGP connection. Otherwise, the PE router needs to be configured with those addresses, or it needs to obtain them in some other way (such as ODR or RIP).

If the PE router has an EBGP connection to the CE router, the addresses to be distributed inter-VPN will be those addresses distributed by the CE router over the EBGP connection. Otherwise, the PE router needs to be configured with those addresses.

11. Configuration of the CE Routers

If the CE router is talking BGP to a PE router, the CE router will need to be configured to set up a CEBGP connection, or both a CEBGP and an EBGP connection, to a PE router. It must then be configured with an address of the PE router for each such connection. This address will be from the address space of the P network.

The CE router should have a static route to the PE router address. This route need not be redistributed into the C-network's IGP (though it should be safe to do so, because we are not trying to handle the case where there is addressing conflict between the C network and the P network).

The CE router does not use VPN-IPv4 addressing, and does not assign tags to the addresses it distributes to the PE router.

If the CE router is at a stub site, then:
if it uses the same PE router(s) for intra-VPN as for inter-VPN traffic, it should be configured to have a default route pointing to the PE router(s), and should inject "default" into its IGP.
if it uses a different PE router for inter-VPN traffic than for intra-VPN traffic, then it must be configured with appropriate static routes, and must inject them into its IGP.

(Even if the CE router talks BGP to the PE router, there is no reason to redistribute the BGP routes into the IGP.)

If the CE router is not at a stub site, then proper administration must be done to ensure that BGP routes and/or default routes are injected into the IGP in a proper manner.

12. Distribution of Routes from CE Routers to PE Routers on CEBGP Connections a. CE Router Procedures A CE router will distribute all routes to all destinations on its site over its CEBGP connection to a PE router. Routes to destinations on other sites (through backdoor routes) may also be distributed to the PE router on the CEBGP connection; this is a matter of policy of the C network.

b. PE Router Procedures

When a PE router receives routes on the CEBGP connection, it will of course translate the IPv4 addresses to VPN-IPv4 addresses. It will also remove from each route any VPN Community attributes that may be present. It will add the NO_EXPORT community attribute, to prevent the route from being distributed out of the Confederation.

The PE router should check the AS-path of each route it receives from the CE outer to ensure that the appropriate Site ASN appears at the beginning.

13. Distribution of Routers from CE Routers to PE Routers on EBGP Connections a. CE Router Procedures A CE router may distribute any routes to a PE router on an EBGP connection. However, it should avoid distributing any route on such a connection unless it intends to export that route to another VPN, or to the public internet.

b. PE Pouter Procedures

The PE router will ignore routes to any destinations that, according to the PE router's configuration, are not to be exported to other VPNs (including the public internet).

If a route from the CE router does not have a Community Attribute associated with it, the PE router will, before further distributing it, add the VPN community for each other VPN to which the route may be exported, according to the PE router's configuration.

If a route from the CE router does have one or more Community Attributes associated with it, the PE router will remove any Community Attributes that do not correspond to VPNs to which the route may be exported, according to the PE router's configuration.

If the PE router allows a particular route to be exported to a number of VPNs, this procedure allows the CE router to specify a subset of those VPNs to which it should be exported. If this is allowed, then the PE router must be able to detect when an EBGP up-date removes a Community Attribute that used to be there, so the route can be withdrawn from the corresponding VPN.

The PE router should check the AS-path of each route it receives from the CE router to ensure that the correct value of the VPN ASN appears at the beginning. If not, the PE router may replace it with the correct value.

The PE router will convert all IPv4 addresses from the CE router to VPN-IPv4 addresses, using the External VPN ID of the CE router's VPN, before redistributing them. There is one exception: if a route is to be distributed to VPN 0, it should be distributed as an IPv4 address, without any Community Attribute. (This allows for distribution to the public internet via a BGP speaker that is not VPN-aware.)

14. Distribution of Routes from Routers to CE Routers on CEBGP Connections

A PE router will distribute to a CE router, over a CEBGP connection, routes to all VPN-IPv4 addresses whose VPN ID is the Internal VPN ID of the CE router's VPN. No other routes shall be distributed on this connection. The VPN-IPv4 addresses will be translated to IPv4 addresses before distribution.

The AS-path should be modified by prepending the P network's ASN.

15. Distribution of Routes from PE Routers to CE Routers on EBGP Connections

A PE router will distribute a route with VPN-IPv4 NLRI to a CE router on an EBGP connection only if both the following conditions hold:
  the PE router is configured to allow the particular VPN-IPv4 address to be exported to the CE router, and
  the PE router received the router with a Community Attribute that corresponds to the VPN of the CE router, or to a CUG that is associated with that CE router.

This ensures that the route came from a proper place, and is going to a proper place.

Community Attributes that represent target VPNs or CUGs should be stripped before the route is distributed to the CE router.

VPN-IPv4 addresses should be translated into IPv4 addresses.

The AS-path should be modified by prepending the P network's ASN.

A PE router will distribute a route with IPv4 NLRI to a CE router on an EBGP connection only if the PE router is explicitly configured to allow that address to be exported to the CE router's VPN. This allows the VPN to import addresses from the public internet.

Inter-VPN-Routing Example

Figure 9:
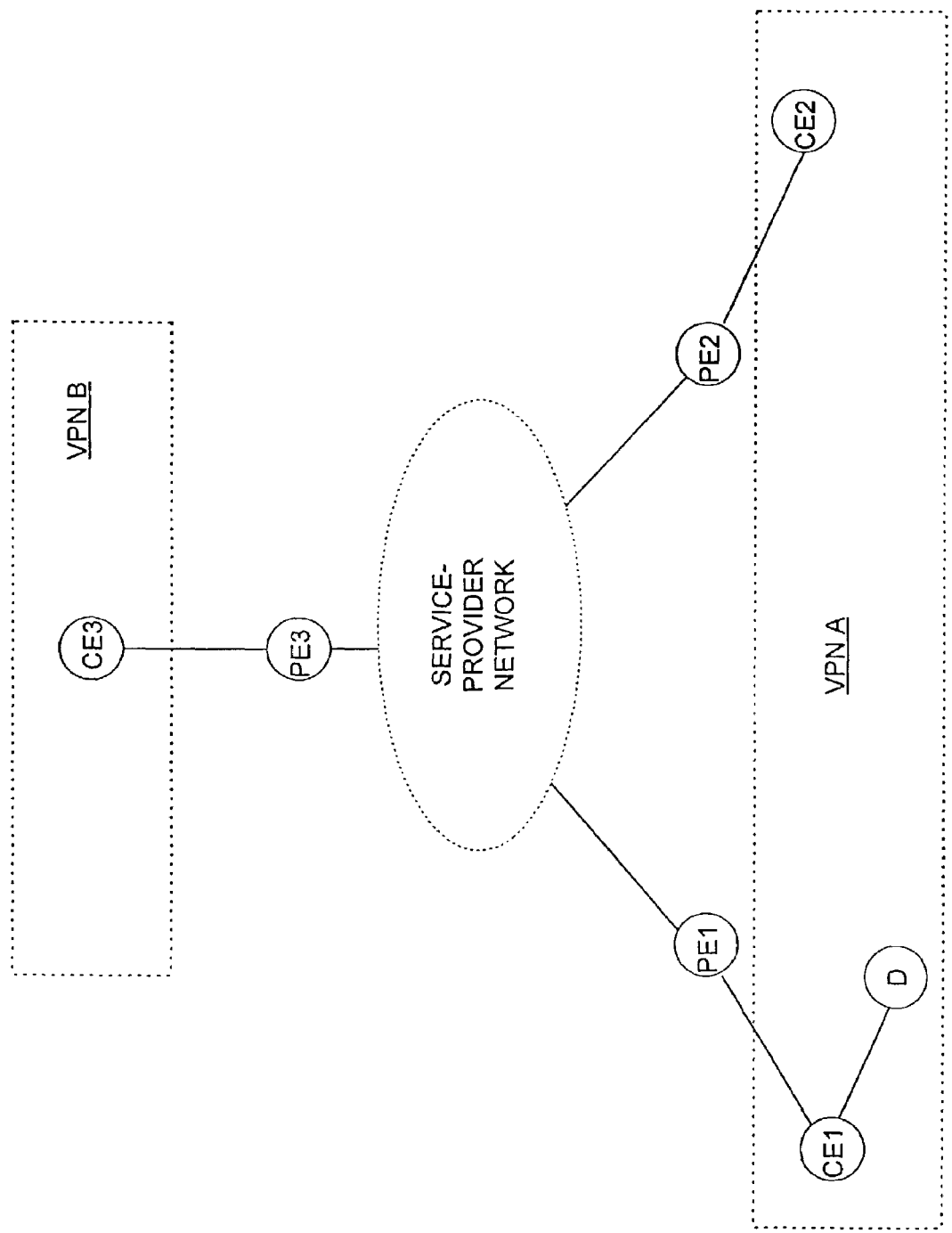
FIG. 9 is a topological diagram used to illustrate inter-VPN communication.

To illustrate the use of internal and external VPN IDs, FIG. 9 depicts a service-provider network simply as an oval, omitting all individual routers except PE1, PE2, and PE3. PE1 and PE2 are edge routers with respect to customer nodes in a first VPN, VPN A, and PE3 is an edge router with respect to a second VPN, VPN B. A target destination D in one VPN A is reached most directly through a customer edge router CE1 at the same site. But VPN A has a firewall in CE2, and the policy is that any packets from outside VPN A must go through CE2 before they go to any VPN A destination.

In this situation, CE1 uses EBGP to advertise to PE1 its access to D. In some manner determined by local configuration, PE1 recognizes that advertisement as being only for VPN A consumption. For example, PE1 may be configured to recognize the interface used by CE1 as one that advertises only intra-VPN reachability, or CE1 may employ a NO_EXPORT value of the BGP community attribute in its advertisement. In any case, PE1 reports itself by IBGP as the next hop to destination Int(D) (where "Int(D)" represents the concatenation of VPN A's internal VPN ID with D's network address or prefix). Preferably, it knows which routers are edge routers with respect to VPN A and makes this advertisement only to them. Alternatively, it is not so discriminating, but it is only such routers that adjust their FIBs in accordance with that information.

In either case, PE2 thereby learns this information and uses it to construct an FIB entry in its per-VPN FIB corresponding to VPN A. (If, as the drawing does not show, PE3 attaches to a CE router that is in VPN A, then it, too, uses that information to construct an FIB entry in its per-VPN FIB corresponding to VPN A.)

Since CE2 is to operate as the firewall, it must advertise itself as according access to all systems that the enterprise is willing to accord extra-VPN visibility, so it also uses EBGP to advertise node D's reachability. In some manner determined by local configuration, PE2 recognizes that advertisement as being for extra-VPN A consumption, and it reports itself as the next hop to destination Ext(D) (where "Ext(D)" represents the concatenation of VPN A's external VPN ID with D's network address).

PE3 thereby learns this information and uses it to construct an FIB entry in its per-VPN FIB corresponding to VPN A. (If, as the drawing does not show, PE2 attaches to a CE router that is in VPN B, then it, too, would use that information to construct an FIB entry in its per-VPN FIB corresponding to VPN B.)

Now, when a packet addressed to D arrives at PE2 from CE2, the packet is identified by, for instance, its incoming interface as coming from VPN A. PE2 looks in its per-VPN FIB for VPN A and sees that the next hop is PE1. This is the intra-VPN case.

When a packet addressed to D arrives at PE3 from CE3, the packet is identified, again possibly by virtue of its incoming interface, as coming from VPN B. PE3 looks in its per-VPN FIB for VPN B and sees that the next hop is PE2. The packet then gets sent to PE2, which sends it on to CE2. CE2 runs the packet through the firewall, and CE2 attempts to forward the packet if the firewall does not reject it. Since the destination is not on-site, the packet gets sent to PE2. This time PE2 identifies the packet as coming from VPN A. PE2 looks up D in its per-VPN FIB for VPN A, and sees that PE1 is the next hop. The packet is then sent to PE1.

In short, when PE router receives a packet from a CE router, it can always identify the CE router from which the packet was just transmitted, so it can identify the VPN from which it just came. This enables the PE router to select the proper per-VPN FIB.

Although CE2 ran the packet that it received in the above scenario through the firewall, it would ordinarily be preferred that only packets from outside VPN A receive this treatment, in which case CE2 will need to know whether a packet that it receives is from a different VPN. The way in which this is accomplished is in general a local-configuration matter, but the most-common approach would likely be for CE2 to have two channels to PE2. Suppose, for instance, that CE2 has two different CE2 interfaces for such communication. It would run BGP on both interfaces. On one of the interfaces, it would advertise reachability to some set of addresses in VPN A (including D) and possibly specify appropriate community attributes to ensure that this information is exported to VPN B. PE2 would use VPN A's external VPN ID for information received over this BGP connection. On the other interface, it would advertise reachability to its on-site addresses, and PE2 would use VPN A's internal VPN ID for information received over this BGP connection.

Although the use of different interfaces would be the most-typical way to provide the different channels by which the achieve the internal- and external-route information and traffic are distinguished, internal routes and external routes could be mapped to the same interface, too, with the demultiplexing provided by, say, the presence or absence of cryptographic information in the packet header.

Alternatives

The foregoing discussion describes an advantageous approach to implementing the present invention's teachings, one whose advantages extend not only to situations in which the customer VPNs' address spaces overlap. But the particular approach there described is far from the only one that can implement the present invention's teachings. For example, some of the routing could be set statically rather than in response to routing protocols such as BGP. Also, although we have described VPN-specific information as being stored in separate tables because that approach seems most convenient, there is no reason in principle why a common table containing VPN-identifying entries could not be used instead.

And our focus on tag switching should not be interpreted to mean that the present invention's teachings are so limited. For instance, although we use tags to contain both the egress-router routing information and the egress-channel routing information, this is by no means a requirement. One could instead use, say, encapsulated IP to hide the inner, egress-channel (and thereby VPN-distinguishing) routing information from the transit routers,. We prefer tag switching because it tends to be more efficient, to use less overhead, and to lend itself to uses where the network administration controls the routes to a greater degree than dynamic IP routing ordinarily allows. Also, unlike encapsulated IP, tag switching supports arrangements in which different VPN sites are attached to the networks of different autonomous service-providers that use BGP to exchange routing information and together form the back-bone-providing service-provider network. And tag switching lends itself to applications in which part of the backbone is an ATM link: tags can be put in the ATM header's VCI field.

But even when tags are used, they can represent the exterior-routing information in a way different from the one that the illustrated embodiment employs. For example, although the illustrated embodiment interprets the exterior-routing tag exemplified by T3 to specify a next hop, it could instead simply contain, say, a VPN identifier that the egress router uses to disambiguate the regular IP address.

Although we prefer to use tags for both the egress-router and egress-channel fields, moreover, the applicability of the present invention's teachings is not so limited. In an architecture in which every PE router always uses different interfaces for links to different VPNs' nodes, for example, the internal-routing field could be provided simply as a tag associated with such an interface. That is, there would be no separate tag for the egress router's interface with the previous P router. In such an arrangement, edge routers could use IGP to install host routes to all of their interfaces with client edge routers. To advertise external reachability, PE2, for instance, would use BGP to specify the IP address of the interface between PE2 and CE2 as the next-hop address for VPN-IPv4 addresses reachable through CE2. And PE2, P2, and P1 would all use TDP to bind tags to the host route to that interface; PE2 would not use the distinguished tag value meaning "pop the tag stack."

In short, the present invention's advantages can be obtained from a wide variety of embodiments. It therefore constitutes a significant advance in the art.

What is claimed is:

1. A router, comprising:
   a port to receive a data message from a customer edge router, said data message sent from a source customer computer addressed to a destination customer computer, said source customer computer and said destination customer computer located within a common virtual private network (VPN);
   a port to receive a reachability message from a provider router, said reachability message giving a route to said destination customer computer and including a VPN ID that identifies the destination computer as being within the common VPN; and
   a transmitter to forward said data message with a tag written in said data message, said tag to designate said VPN.

2. The router as in claim 1 further comprising:
   a port to receive a second reachability message from a provider router, said second reachability message giving a route to an external computer having the same address as said destination customer computer, said external computer located in a second VPN other than said VPN of said destination customer computer, wherein said tag is used to distinguish between said VPN of said destination customer computer and said second VPN.

3. The router as in claim 1 further comprising:
   said router is a provider edge router.

4. The router as in claim 1 further comprising: said reachability message originating at a customer edge router having connections to said destination customer computer.

5. A router, comprising:
   a port to receive a data message from a first customer edge router, said data message sent from a source customer computer addressed to a destination customer computer, said source customer computer and said destination customer computer located in separate virtual private networks (VPNs);
   a port to receive a reachability message from a provider router, said reachability message giving a route to said destination customer computer and including a VPN ID that identifies the destination computer as being within a separate VPN from the source customer computer; and
   a transmitter to forward said data message with a tag written in said data message, said tag to designate a second customer edge router located within the same VPN as said destination customer computer, said customer edge router used for receiving incoming data messages from outside said VPN of said destination customer computer.

6. The router as in claim 5 further comprising:
   a port to receive a second reachability message from a provider router, said second reachability message giving a route to an external computer having the same address as said destination customer computer, said external computer located in a second VPN other than said VPN of said destination customer computer, wherein said tag is used to distinguish between said VPN of said destination customer computer and said second VPN.

7. The router of claim 5 further comprising:
   said second customer edge router is a firewall.

8. A router, comprising:
   a port to receive a data message from a customer edge router, said data message sent from a source customer computer addressed to a destination customer computer, said source customer computer and said destination customer computer located within a common virtual private network (VPN);
   a port to receive a reachability message from a provider router, said reachability message giving a route to said destination customer computer;

a transmitter to forward said data message with a tag written in said data message, said tag to designate said VPN; and a port to receive a second reachability message from a provider router, said second reachability message giving a route to an external computer having the same address as said destination customer computer, said external computer located in a second VPN other than said VPN of said destination customer computer, wherein said tag is used to distinguish between said VPN of said destination customer computer and said second VPN.

9. The router of claim 8 wherein the reachability message includes a first VPN ID that identifies the destination computer as being within the common VPN, and the second reachability message includes a second VPN ID that identifies the external computer as being within the second VPN.

10. The router of claim 8 wherein the tag written into said data message is a value written into an egress-channel field of said data message, the value specifying a channel that links to the common VPN.

11. The router of claim 8 wherein said data message further comprises a second tag that specifies at least a next hop in a route to a provider edge router through which said message should be directed in order to reach said destination customer computer.

12. The router of claim 11 wherein said second tag is a value written into a egress-router field.

13. The router of claim 8 wherein said reachability message is an Internal Border Gateway Protocol (IBGP) message.

14. A method for use in a router, said method comprising the steps of:
receiving a data message from a customer edge router, said data message sent from a source customer computer addressed to a destination customer computer, said source customer computer and said destination customer computer located within a common virtual private network (VPN);
receiving a reachability message from a provider router, said reachability message giving a route to said destination customer computer and including a VPN ID that identifies the destination computer as being within the common VPN; and
forwarding said data message with a tag written in said data message, said tag to designate said VPN.

15. A method comprising:
receiving a data message from a customer edge router, said data message sent from a source customer computer addressed to a destination customer computer, said source customer computer and said destination customer computer located within a common virtual private network (VPN);
receiving a reachability message from a provider router, said reachability message giving a route to said destination customer computer;
forwarding said data message with a tag written in said data message, said tag to designate said VPN;
receiving a second reachability message from a provider router, said second reachability message giving a route to an external computer having the same address as said destination customer computer, said external computer located in a second VPN other than said VPN of said destination customer computer, wherein said tag is used to distinguish between said VPN of said destination customer computer and said second VPN.

16. The method of claim 15 wherein the reachability message includes a first VPN ID that identifies the destination computer as being within the common VPN, and the second reachability message includes a second VPN ID that identifies the external computer as being within the second VPN.

17. The method of claim 15 wherein the tag written into said data message is a value written into a egress-channel field of said data message, the value specifying a channel that links to the common VPN.

18. The method of claim 15 wherein said data message further comprises a second tag that specifies at least a next hop in a route to a provider edge router through which said message should be directed in order to reach said destination customer computer.

19. The method of claim 18 wherein said second tag is a value written into an egress-router field.

20. The method of claim 15 wherein said reachability message is an Internal Border Gateway Protocol (IBGP) message.

21. A method for use in a router, said method comprising the steps of:
receiving a data message from a first customer edge router, said data message sent from a source customer computer addressed to a destination customer computer, said source customer computer and said destination customer computer located in separate virtual private networks (VPNs);
receiving a reachability message from a provider router, said reachability message giving a route to said destination customer computer and including a VPN ID that identifies the destination computer as being within a separate VPN from the source customer computer; and
forwarding said data message with a tag written in said data message, said tag to designate a second customer edge router located within the same VPN as said destination customer computer, said customer edge router used for receiving incoming data messages from outside said VPN of said destination customer computer.

22. The method as in claim 21 further comprising:
receiving a second reachability message from a provider router, said second reachability message giving a route to an external computer having the same address as said destination customer computer, said external computer located in a second VPN other than said VPN of said destination customer computer, wherein said tag is used to distinguish between said VPN of said destination customer computer and said second VPN.

23. A router, comprising:
means for receiving a data message sent from a customer edge router, said data message from a source customer computer addressed to a destination customer computer, said source customer computer and said destination customer computer located within a common virtual private network (VPN);
means for receiving a reachability message from a provider router, said reachability message giving a route to said destination customer computer and including a VPN ID that identifies the destination computer as being within the common VPN; and
means for forwarding said data message with a tag written in said data message, said tag to designate said VPN.

24. A computer readable media including software for execution on a processor, the software when executed operable to:

receive a data message from a customer edge router, said data message sent from a source customer computer addressed to a destination customer computer, said source customer computer and said destination customer computer located within a common virtual private network (VPN);

receive a reachability message from a provider router, said reachability message giving a route to said destination customer computer;

forward said data message with a tag written in said data message, said tag to designate said VPN; and receive a second reachability message from a provider router, said second reachability message giving a route to an external computer having the same address as said destination customer computer, said external computer located in a second VPN other than said VPN of said destination customer computer, wherein said tag is used to distinguish between said VPN of said destination customer computer and said second VPN.

* * * * *

UNITED STATES PATENT AND TRADEMARK OFFICE
CERTIFICATE OF CORRECTION

PATENT NO.         : 7,307,990 B2                                                     Page 1 of 1
APPLICATION NO.    : 10/246936
DATED              : December 11, 2007
INVENTOR(S)        : Rosen et al.

It is certified that error appears in the above-identified patent and that said Letters Patent is hereby corrected as shown below:

Col. 6, Line 44, please replace "LP" with --IP--

Col. 7, Line 36, please delete "is"

Col. 14, Line 46, please delete "is"

Col. 20, Line 32, please replace "TI" with --T1--

Col. 26, Line 36, please delete "other"

Col. 26, Line 39, please delete "dress"

Col. 30, Line 35, please replace "Pouter" with --Router--

Signed and Sealed this
Tenth Day of May, 2011

David J. Kappos
*Director of the United States Patent and Trademark Office*